(12) United States Patent
Zheng et al.

(10) Patent No.: US 9,131,239 B2
(45) Date of Patent: Sep. 8, 2015

(54) UNIFIED MERGE MODE AND ADAPTIVE MOTION VECTOR PREDICTION MODE CANDIDATES SELECTION

(75) Inventors: Yunfei Zheng, Cupertino, CA (US); Xianglin Wang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 526 days.

(21) Appl. No.: 13/487,914

(22) Filed: Jun. 4, 2012

(65) Prior Publication Data

US 2012/0320968 A1   Dec. 20, 2012

Related U.S. Application Data

(60) Provisional application No. 61/499,114, filed on Jun. 20, 2011, provisional application No. 61/506,558, filed on Jul. 11, 2011, provisional application No. 61/509,007, filed on Jul. 18, 2011.

(51) Int. Cl.
*H04N 7/32* (2006.01)
*H04N 7/26* (2006.01)
*H04N 19/40* (2014.01)
*H04N 19/52* (2014.01)
*H04N 19/51* (2014.01)

(52) U.S. Cl.
CPC ............ *H04N 19/40* (2014.11); *H04N 19/52* (2014.11); *H04N 19/00472* (2013.01); *H04N 19/00696* (2013.01)

(58) Field of Classification Search
CPC ................ H04N 19/00472; H04N 19/00696

USPC .......................................... 375/240
See application file for complete search history.

(56) References Cited

U.S. PATENT DOCUMENTS

| 5,428,403 | A | 6/1995 | Andrew et al. |
| 5,751,364 | A | 5/1998 | Yasuda et al. |
| 6,289,052 | B1 | 9/2001 | Faryar et al. |

(Continued)

FOREIGN PATENT DOCUMENTS

WO    2012042893 A1    4/2012

OTHER PUBLICATIONS

Bross et al., "High efficiency video coding (HEVC) text specification draft 6," 8th Meeting: San Jose, CA, USA, Feb. 1-10, 2012, JCTVC-H1003, 259 pp.

(Continued)

*Primary Examiner* — Dave Czekaj
*Assistant Examiner* — Mohammad J Rahman
(74) *Attorney, Agent, or Firm* — Shumaker & Sieffert, P.A.

(57) ABSTRACT

A unified candidate block set for both adaptive motion vector prediction (AMVP) mode and merge mode for use in inter-prediction is proposed. In general, the same candidate block set is used regardless of which motion vector prediction mode (e.g., merge mode or AMVP mode) is used. In other examples of this disclosure, one candidate block in a set of candidate blocks is designated as an additional candidate block. The additional candidate block is used if one of the other candidate blocks is unavailable. Also, the disclosure proposes a checking pattern where the left candidate block is checked before the below left candidate block. Also, the above candidate block is checked before the right above candidate block.

28 Claims, 18 Drawing Sheets

AMVP AND MERGE MODE

(56) References Cited

U.S. PATENT DOCUMENTS

| | | | |
|---|---|---|---|
| 6,519,287 | B1 | 2/2003 | Hawkins et al. |
| 7,260,148 | B2 | 8/2007 | Sohm |
| 8,976,865 | B2* | 3/2015 | Park et al. ............... 375/240.16 |
| 2005/0052145 | A1 | 3/2005 | Carrier et al. |
| 2005/0053146 | A1 | 3/2005 | Mukerjee |
| 2005/0163216 | A1 | 7/2005 | Boon et al. |
| 2005/0232358 | A1* | 10/2005 | Nicolas ..................... 375/240.16 |
| 2006/0002470 | A1 | 1/2006 | Sakurai |
| 2006/0072676 | A1* | 4/2006 | Gomila ..................... 375/240.27 |
| 2006/0193385 | A1 | 8/2006 | Yin et al. |
| 2008/0192827 | A1 | 8/2008 | Beric et al. |
| 2009/0034621 | A1 | 2/2009 | Joch et al. |
| 2009/0074073 | A1 | 3/2009 | Srinivasan et al. |
| 2009/0116760 | A1* | 5/2009 | Boon et al. ..................... 382/238 |
| 2010/0080296 | A1 | 4/2010 | Lee et al. |
| 2010/0118945 | A1* | 5/2010 | Wada et al. ............... 375/240.12 |
| 2010/0150253 | A1* | 6/2010 | Kuo et al. ................. 375/240.27 |
| 2010/0329342 | A1 | 12/2010 | Joshi et al. |
| 2011/0007800 | A1* | 1/2011 | Zheng et al. ............. 375/240.12 |
| 2011/0038420 | A1 | 2/2011 | Lee et al. |
| 2011/0129016 | A1 | 6/2011 | Sekiguchi et al. |
| 2011/0176613 | A1* | 7/2011 | Tsai et al. ................. 375/240.16 |
| 2011/0243230 | A1* | 10/2011 | Liu ............................ 375/240.14 |
| 2012/0008688 | A1 | 1/2012 | Tsai et al. |
| 2012/0128060 | A1 | 5/2012 | Lin et al. |
| 2012/0134415 | A1 | 5/2012 | Lin et al. |
| 2012/0134416 | A1* | 5/2012 | Lin et al. .................. 375/240.16 |
| 2012/0134419 | A1 | 5/2012 | Pateux et al. |
| 2012/0213279 | A1* | 8/2012 | Lu et al. .................... 375/240.12 |
| 2012/0236941 | A1* | 9/2012 | Lin et al. .................. 375/240.16 |
| 2012/0236942 | A1 | 9/2012 | Lin et al. |
| 2013/0182760 | A1 | 7/2013 | Sasai et al. |
| 2014/0126629 | A1* | 5/2014 | Park et al. ................ 375/240.02 |

OTHER PUBLICATIONS

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

International Preliminary Report on Patentability—PCT/US2012/040927—The International Bureau of WIPO Geneva Switzerland, Sep. 30, 2013, 7 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Wiegand et al., "WD3: Working Draft 3 of High-Efficiency Video Coding," Document JCTVC-E603, 5th Meeting: Geneva, CH, Mar. 16-23, 2011, 193 pp.

Wiegand et al., "WD1: Working Draft 1 of High-Efficiency Video Coding", JCTVC-C403, 3rd Meeting: Guangzhou, CN, Oct. 7-15, 2010, 137 pp.

Second Written Opinion from International Application No. PCT/US2012/040927, dated Jun. 3, 2013, 6 pp.

International Search Report and Written Opinion—PCT/US2012/040927—ISA/EPO—Jul. 24, 2012—8 pp.

McCann et al., "High Efficiency Video Coding (HEVC) Test Model 2 (HM 2) Encoder Description", Joint Collaborative Team on Video Coding, JCTVC-D502, Oct. 7-15, 2010, 26 pp.

U.S. Appl. No. 13/487,996, by Yunfei Zheng, filed Jun. 4, 2012.

Wiegand et al., "WD2: Working Draft 2 of High-Efficiency Video Coding", Joint Collaborative Team on Video Coding, JCTVC-D503, Jan. 20-28, 2011, 153 pp.

Zheng et al., "CE9: Unified Merge and AMVP candidates selection (UNI03)", Joint Collaborative Team on Video Coding, JCTVC-F297, Jul. 14-22, 2011, 3 pp.

Zheng et al., "Unified Motion Vector Predictor Selection for Merge and AMVP", Joint Collaborative Team on Video Coding, JCTVC-E396, Mar. 16-23, 2011, 5 pp.

Huang et al., "Affine Skip and Direct Modes for Efficient Video Coding," ECSE Dept., Rensselaer Polytechnic Institute, Nov. 27-30, 2012, Troy, NY, IEEE DOI:10.1109/VCIP.2012.6410841, USA, 6 pp.

ITU-T Recommendation H.263, "Video coding for low bit rate communication," Series H: Audiovisual and Multimedia Systems, Infrastructure of audiovisual services—Coding of moving video, Feb. 1998, 11 pp.

Jung et al, "Description of Core Experiment 9: MV Coding and Skip/Merge operations," [online], JCTVC-D609, Retrieved from the Internet: <URL:http://phenix.it-sudparis.eu/jct/doc_end_user/documents/4_Daegu/wg11/JCTVC-D609-v3.zip>, Jan. 20-28, 2011, 11 pp.

McCann et. al., "HM3: High Efficiency Video Coding (HEVC) Test Model 3 Encoder Description," [online], Joint Collaborative Team on Video Coding (JCT-VC) of ITU-T SG16 WP3 and ISO/IEC JTC1/SC29/WG11, Document: JCTVC-E602 (version 1), Mar. 16-23, 2011, 35 pp.

Yeo, et.al., "Simplified AMVP candidate derivation for Inter and Merge modes", [online], Mar. 16-23, 2011, Joint Collaborative Team on Video Coding (JCT-VC) of ITU-T SG16 WP3 and ISO/IEC JTC1/SC29/WG11, Document: JCTVC-E101(version 2), 9 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "High efficiency video coding (HEVC) text specification draft 10 (For FDIS & Last Call)," 12th Meeting: Geneva, CH, Jan. 14-23, 2013, JCTVC-L1003_v34, 310 pp.

ITU-T H.265, Series H: Audiovisual and Multimedia Systems, Infrastructure of audiovisual services—Coding of moving video, High efficiency video coding, The International Telecommunication Union, Apr. 2013, 317 pp.

* cited by examiner

US 9,131,239 B2

UNIFIED MERGE MODE AND ADAPTIVE MOTION VECTOR PREDICTION MODE CANDIDATES SELECTION

This application claims the benefit of U.S. Provisional Application No. 61/506,558, filed Jul. 11, 2011, U.S. Provisional Application No. 61/499,114, filed Jun. 20, 2011 and U.S. Provisional Application No. 61/509,007, filed Jul. 18, 2011, all of which are hereby incorporated by reference in their entirety.

TECHNICAL FIELD

This disclosure relates to video coding, and more particularly to techniques for selecting motion vector prediction candidate blocks in a motion vector prediction process.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques include spatial prediction and/or temporal prediction to reduce or remove redundancy inherent in video sequences. For block-based video coding, a video frame or slice may be partitioned into blocks. Each block can be further partitioned. Blocks in an intra-coded (I) frame or slice are encoded using spatial prediction with respect to reference samples in neighboring blocks in the same frame or slice. Blocks in an inter-coded (P or B) frame or slice may use spatial prediction with respect to reference samples in neighboring blocks in the same frame or slice or temporal prediction with respect to reference samples in other reference frames. Spatial or temporal prediction results in a predictive block for a block to be coded. Residual data represents pixel differences between the original block to be coded and the predictive block.

An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in a particular order to produce a one-dimensional vector of transform coefficients for entropy coding.

SUMMARY

In general, this disclosure describes techniques for coding video data. This disclosure describes techniques for selecting motion vector prediction candidate blocks in a motion vector prediction process.

In one example of the disclosure, a method of encoding a motion vector in a video coding process comprises determining one of a plurality of modes for a motion vector prediction process and performing the motion vector prediction process for the current block of video data using the determined mode and a set of candidate blocks, wherein the set of candidate blocks is the same for each of the plurality of modes.

In another example of the disclosure, a method of decoding a motion vector in a video coding process comprises determining one of a plurality of modes for a motion vector prediction process for a current block of video data and determining a candidate block from a set of candidate blocks, wherein the set of candidate blocks is the same for each of the plurality of modes, and wherein information associated with the candidate block is used to decode a motion vector for the current block.

In another example of the disclosure, a method of encoding a motion vector in a video coding process comprises determining one of a plurality of modes for a motion vector prediction process and performing the motion vector prediction process for the current block of video data using the determined mode and a set of candidate blocks, wherein the set of candidate blocks is the same for each of the plurality of modes, wherein one candidate block in the set of candidate blocks is designated as an additional candidate block, and wherein the additional candidate block is used if another of the candidate blocks of the set of candidate blocks is unavailable.

In another example of the disclosure, a method of decoding a motion vector in a video coding process comprises receiving a syntax element indicating one of a plurality of modes for a motion vector prediction process for a current block of video data, and receiving an index indicating a candidate block from a set of candidate blocks, wherein the set of candidate blocks is the same for each of the plurality of modes, wherein one candidate block in the set of candidate blocks is designated as an additional candidate block, wherein the additional candidate block is used if another of the candidate blocks of the set of candidate blocks is unavailable, and wherein information associated with the candidate block is used to decode a motion vector for the current block.

The details of one or more examples are set forth in the accompanying drawings and the description below. Other features, objects, and advantages will be apparent from the description and drawings, and from the claims.

DETAILED DESCRIPTION

Figure 1A:
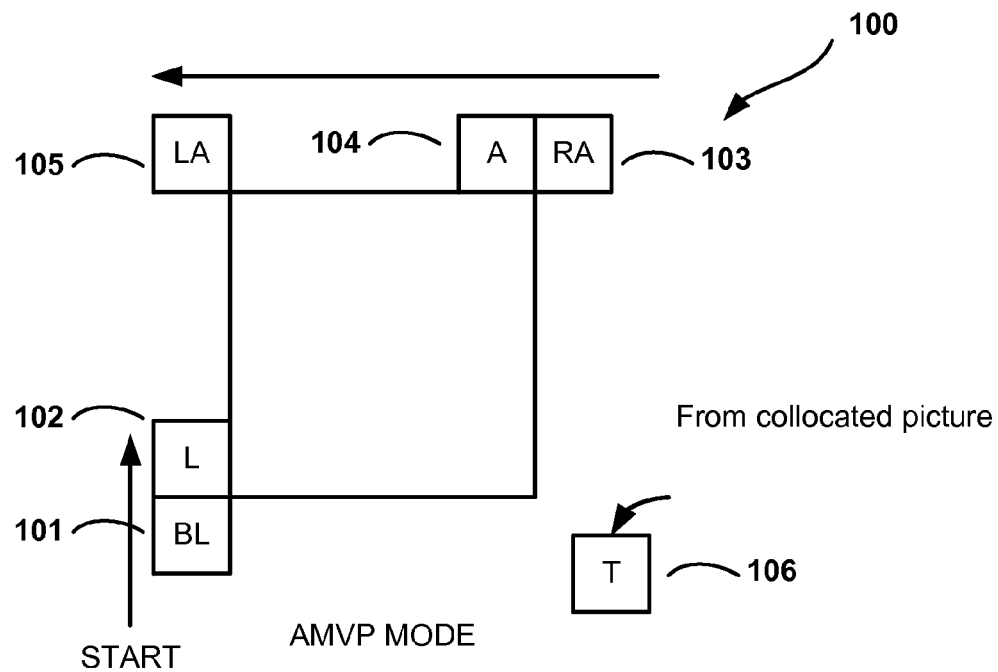
FIG. 1A is a conceptual drawing illustrating candidate blocks for motion vector prediction according to an adaptive motion vector prediction (AMVP) mode.

In general, this disclosure describes techniques for coding video data. This disclosure describes techniques for selecting motion vector prediction candidate blocks in a motion vector prediction process. In one example, this disclosure proposes that each of a plurality of motion vector prediction modes uses the same set of candidate blocks to predict a motion vector for a current block. In another example, this disclosure proposes that one candidate block in the set of candidate blocks is designated as an additional candidate block. The additional candidate block is used if another one of the blocks in the set is unavailable.

Digital video devices implement video compression techniques to encode and decode digital video information more efficiently. Video compression may apply spatial (intra-frame) prediction and/or temporal (inter-frame) prediction techniques to reduce or remove redundancy inherent in video sequences.

For video coding according to the high efficiency video coding (HEVC) standard currently under development by the Joint Cooperative Team for Video Coding (JCT-VC), a video frame may be partitioned into coding units. A coding unit (CU) generally refers to an image region that serves as a basic unit to which various coding tools are applied for video compression. A CU usually has a luminance component, denoted as Y, and two chroma components, denoted as U and V. Depending on the video sampling format, the size of the U and V components, in terms of number of samples, may be the same as or different from the size of the Y component. A CU is typically square, and may be considered to be similar to a so-called macroblock, e.g., under other video coding standards such as ITU-T H.264.

To achieve better coding efficiency, a coding unit may have variable sizes depending on video content. In addition, a coding unit may be split into smaller blocks for prediction or transform. In particular, each coding unit may be further partitioned into prediction units (PUs) and transform units (TUs). Prediction units may be considered to be similar to so-called partitions under other video coding standards, such as H.264. Transform units (TUs) refer to blocks of residual data to which a transform is applied to produce transform coefficients.

Coding according to some of the presently proposed aspects of the developing HEVC standard will be described in this application for purposes of illustration. However, the techniques described in this disclosure may be useful for other video coding processes, such as those defined according to H.264 or other standard or proprietary video coding processes.

HEVC standardization efforts are based on a model of a video coding device referred to as the HEVC Test Model (HM). The HM presumes several capabilities of video coding devices over devices according to, e.g., ITU-T H.264/AVC. For example, whereas H.264 provides nine intra-prediction encoding modes, HM provides as many as thirty-four intra-prediction encoding modes.

According to the HM, a CU may include one or more prediction units (PUs) and/or one or more transform units (TUs). Syntax data within a bitstream may define a largest coding unit (LCU), which is a largest CU in terms of the number of pixels. In general, a CU has a similar purpose to a macroblock of H.264, except that a CU does not have a size distinction. Thus, a CU may be split into sub-CUs. In general, references in this disclosure to a CU may refer to a largest coding unit of a picture or a sub-CU of an LCU. An LCU may be split into sub-CUs, and each sub-CU may be further split into sub-CUs. Syntax data for a bitstream may define a maximum number of times an LCU may be split, referred to as CU depth. Accordingly, a bitstream may also define a smallest coding unit (SCU). This disclosure also uses the term "block" or "portion" to refer to any of a CU, PU, or TU. In general, "portion" may refer to any sub-set of a video frame.

An LCU may be associated with a quadtree data structure. In general, a quadtree data structure includes one node per CU, where a root node corresponds to the LCU. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU.

Moreover, TUs of leaf-CUs may also be associated with respective quadtree data structures. That is, a leaf-CU may include a quadtree indicating how the leaf-CU is partitioned into TUs. This disclosure refers to the quadtree indicating how an LCU is partitioned as a CU quadtree and the quadtree indicating how a leaf-CU is partitioned into TUs as a TU quadtree. The root node of a TU quadtree generally corresponds to a leaf-CU, while the root node of a CU quadtree generally corresponds to an LCU. TUs of the TU quadtree that are not split are referred to as leaf-TUs.

A leaf-CU may include one or more prediction units (PUs). In general, a PU represents all or a portion of the corresponding CU, and may include data for retrieving a reference sample for the PU. For example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1) for the motion vector. Data for the leaf-CU defining the PU(s) may also describe, for example, partitioning of the CU into one or more PUs. Partitioning modes may differ depending on whether the CU is not predictively coded, intra-prediction mode encoded, or inter-prediction mode encoded. For intra coding, a PU may be treated the same as a leaf transform unit described below.

To code a block (e.g., a prediction unit (PU) of video data), a predictor for the block is first derived. The predictor can be derived either through intra (I) prediction (i.e. spatial prediction) or inter (P or B) prediction (i.e. temporal prediction). Hence, some prediction units may be intra-coded (I) using spatial prediction with respect to neighbouring reference blocks in the same frame, and other prediction units may be inter-coded (P or B) with respect to reference blocks in other frames.

Upon identification of a predictor, the difference between the original video data block and its predictor is calculated. This difference is also called the prediction residual, and refers to the pixel value differences between the pixels of the block to be coded and corresponding pixels of the reference block, i.e., predictor. To achieve better compression, the prediction residual (i.e., the array of pixel difference values) is generally transformed, e.g., using a discrete cosine transform (DCT), integer transform, Karhunen-Loeve (K-L) transform, or other transform.

Coding a PU using inter-prediction involves calculating a motion vector between a current block and a block in a reference frame. Motion vectors are calculated through a process called motion estimation (or motion search). A motion vector, for example, may indicate the displacement of a prediction unit in a current frame relative to a reference sample of a reference frame. A reference sample may be a block that is found to closely match the portion of the CU including the PU being coded in terms of pixel difference, which may be determined by sum of absolute difference (SAD), sum of squared difference (SSD), or other difference metrics. The reference sample may occur anywhere within a reference frame or reference slice. In some examples, the reference sample may occur at a fractional pixel position. Upon finding a portion of the reference frame that best matches the current portion, the encoder determines the current motion vector for the current portion as the difference in the location from the current portion to the matching portion in the reference frame (i.e., from the center of the current portion to the center of the matching portion).

In some examples, an encoder may signal the motion vector for each portion in the encoded video bitstream. The signaled motion vector is used by the decoder to perform motion compensation in order to decode the video data. However, signaling the original motion vector directly may result in less efficient coding, as a large number of bits are typically needed to convey the information.

In some instances, rather than directly signaling the original motion vector, the encoder may predict a motion vector for each partition, i.e., for each PU. In performing this motion vector prediction, the encoder may select a set of candidate motion vectors determined from spatially neighboring blocks in the same frame as the current portion or a candidate motion vector determined from a co-located block in a reference frame. The encoder may perform motion vector prediction, and if needed, signal the prediction difference rather than signal an original motion vector to reduce bit rate in signaling.

The candidate motion vector vectors from the spatially neighboring blocks may be referred to as spatial MVP candidates, whereas the candidate motion vector from the co-located block in another reference frame may be referred to as temporal MVP candidate.

Two different modes or types of motion vector prediction are proposed in the current working draft of the HEVC standard. One mode is referred to as a "merge" mode. The other mode is referred to as adaptive motion vector prediction (AMVP). In merge mode, the encoder instructs a decoder, through bitstream signaling of prediction syntax, to copy a motion vector, reference index (identifying a reference frame, in a given reference picture list, to which the motion vector points) and the motion prediction direction (which identifies the reference picture list (List 0 or List 1), i.e., in terms of whether the reference frame temporally precedes or follows the currently frame) from a selected candidate motion vector for a current portion of the frame. This is accomplished by signaling in the bitstream an index into a candidate motion vector list identifying the selected candidate motion vector (i.e., the particular spatial MVP candidate or temporal MVP candidate). Thus, for merge mode, the prediction syntax may include a flag identifying the mode (in this case "merge" mode) and an index identifying the selected candidate motion vector. In some instances, the candidate motion vector will be in a causal portion in reference to the current portion. That is, the candidate motion vector will have already been decoded by the decoder. As such, the decoder has already received and/or determined the motion vector, reference index, and motion prediction direction for the causal portion. As such, the decoder may simply retrieve the motion vector, reference index, and motion prediction direction associated with the causal portion from memory and copy these values as the motion information for the current portion. To reconstruct a block in merge mode, the decoder obtains the predictive block using the derived motion information for the current portion, and adds the residual data to the predictive block to reconstruct the coded block.

In AMVP, the encoder instructs the decoder, through bitstream signaling, to only copy the motion vector from the candidate portion and use the copied vector as a predictor for motion vector of the current portion, and signals the motion vector difference (MVD). The reference frame and the prediction direction associated with the motion vector of the current portion are signaled separately. An MVD is the difference between the current motion vector for the current portion and a motion vector predictor derived from a candidate portion. In this case, the encoder, using motion estimation, determines an actual motion vector for the block to be coded, and then determines the difference between the actual motion vector and the motion vector predictor as the MVD value. In this way, the decoder does not use an exact copy of the candidate motion vector as the current motion vector, as in the merge mode, but may rather use a candidate motion vector that may be "close" in value to the current motion vector determined from motion estimation and add the MVD to reproduce the current motion vector. To reconstruct a block in AMVP mode, the decoder adds the corresponding residual data to reconstruct the coded block.

In most circumstances, the MVD requires fewer bits to signal than the entire current motion vector. As such, AMVP allows for more precise signaling of the current motion vector while maintaining coding efficiency over sending the whole motion vector. In contrast, the merge mode does not allow for the specification of an MVD, and as such, merge mode sacrifices accuracy of motion vector signaling for increased signaling efficiency (i.e., fewer bits). The prediction syntax for AMVP may include a flag for the mode (in this case AMVP flag), the index for the candidate portion, the MVD between the current motion vector and the predictive motion vector from the candidate portion, the reference index, and the motion prediction direction.

Once motion estimation is performed to determine a motion vector for a current portion, the encoder compares the matching portion in the reference frame to the current portion. This comparison typically involves subtracting the portion (which is commonly referred to as a "reference sample") in the reference frame from the current portion and results in so-called residual data, as mentioned above. The residual data indicates pixel difference values between the current portion and the reference sample. The encoder then transforms this residual data from the spatial domain to a transform domain, such as the frequency domain. Usually, the encoder applies a discrete cosine transform (DCT) to the residual data to accomplish this transformation. The encoder performs this transformation in order to facilitate the compression of the residual data because the resulting transform coefficients represent different frequencies, wherein the majority of energy is usually concentrated on a few low frequency coefficients.

Typically, the resulting transform coefficients are grouped together in a manner that enables run-length encoding, especially if the transform coefficients are first quantized (rounded). The encoder performs this run-length encoding of the quantized transform coefficients and then performs statistical lossless (or so-called "entropy") encoding to further compress the run-length coded quantized transform coefficients.

After performing lossless entropy coding, the encoder generates a bitstream that includes the encoded video data. This bitstream also includes a number of prediction syntax elements in certain instances that specify whether, for example, motion vector prediction was performed, the motion vector mode, and a motion vector predictor (MVP) index (i.e., the index of the candidate portion with the selected motion vector). The MVP index may also be referred to as its syntax element variable name "mvp_idx."

In a current design being proposed for adoption by the ITU-T/ISO/IEC Joint Collaborative Team on Video Coding (JCT-VC), referred to as high efficiency video coding (HEVC), the encoder performs a number of motion vector prediction modes by which to predict a motion vector for a current portion including 1) AMVP and 2) merge mode described above. These two modes are similar, although AMVP provides for more flexibility in terms of being able to define MVDs, motion prediction directions and reference indices while the merge mode merely copies this motion vector information (i.e., motion vector, motion prediction direction, and reference index) and does not allow for the increased precision of an MVD.

Figure 1B:
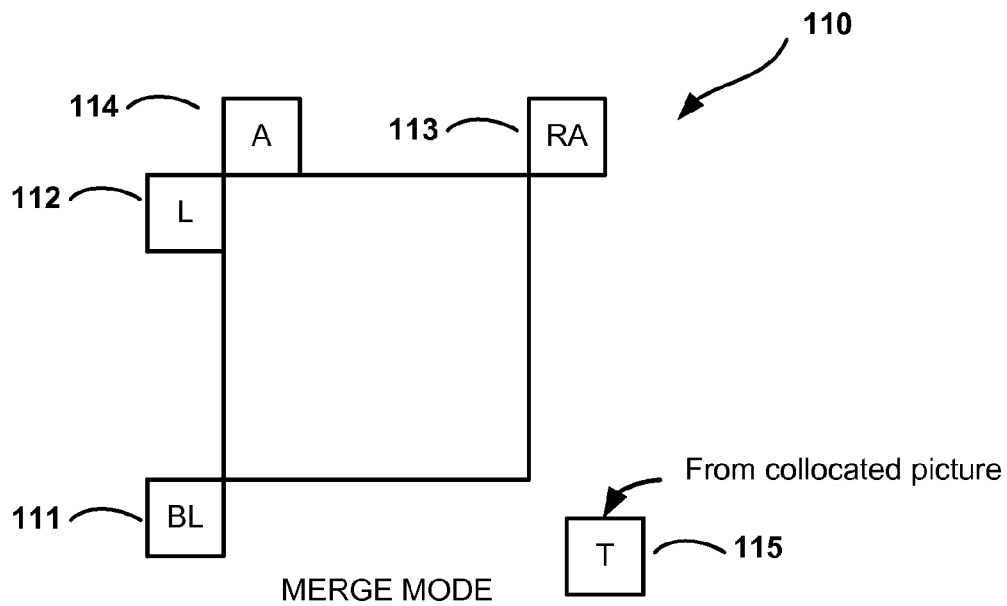
FIG. 1B is a conceptual drawing illustrating candidate blocks for motion vector prediction according to merge mode.

FIG. 1A shows the set of candidate blocks 100 (or portions/blocks of a PU) currently proposed in the HEVC standard for use in AMVP mode, while FIG. 1B shows the set of candidate blocks 110 currently proposed in the HEVC standard for use in merge mode. AMVP mode uses six candidate blocks: the below left (BL) block 101, the left (L) block 102, the right above (RA) block 103, the above (A) block 104, the left above (LA) block 105, and the temporal block (T) 106. Note that, in addition to a set of candidate blocks, the AMVP mode also specifies an order for checking the candidate blocks. In the example of FIG. 1A, the checking pattern proceeds as follows: BL-L-RA-A-LA-T. As shown in FIG. 1B, merge mode uses five candidate blocks: the below left (BL) block 111, the left (L) block 112, the right above (RA) block 113, the above (A) block 114, and the temporal (T) block 115. The motion vectors associated with these candidate blocks are used for determining a motion vector predictor in merge mode and AMVP mode. Merge mode may use a similar checking pattern as AMVP, or may use a different checking pattern.

As discussed above, AMVP mode uses six candidate blocks, while merge mode uses five candidate blocks. Also, other than the right above (RA), the below left (BL), and the temporal (T) blocks, the candidate blocks for AMVP mode and merge mode are in different locations. As such, a large number of candidate blocks must be stored and considered during both the encoding and decoding process. Also, the checking pattern for AMVP may not be optimal as the lower left block may not be available in all circumstances. Such circumstances include when the lower left block has not yet been coded (e.g., it is across a slice or CU boundary) or if data for the lower left block is corrupted.

In this disclosure, a unified candidate block set for both AMVP and merge mode is proposed. In general, the same candidate block set is used regardless of which motion vector prediction mode (e.g., merge mode or AMVP mode) is used. As such, less memory is needed for storing motion vectors and other inter-prediction related information (e.g., reference frame, prediction direction, etc.). In other examples of this disclosure, techniques for using a set of candidate blocks that includes an additional candidate block are proposed. Also, techniques for a more optimal checking pattern are also disclosed.

Figure 2:
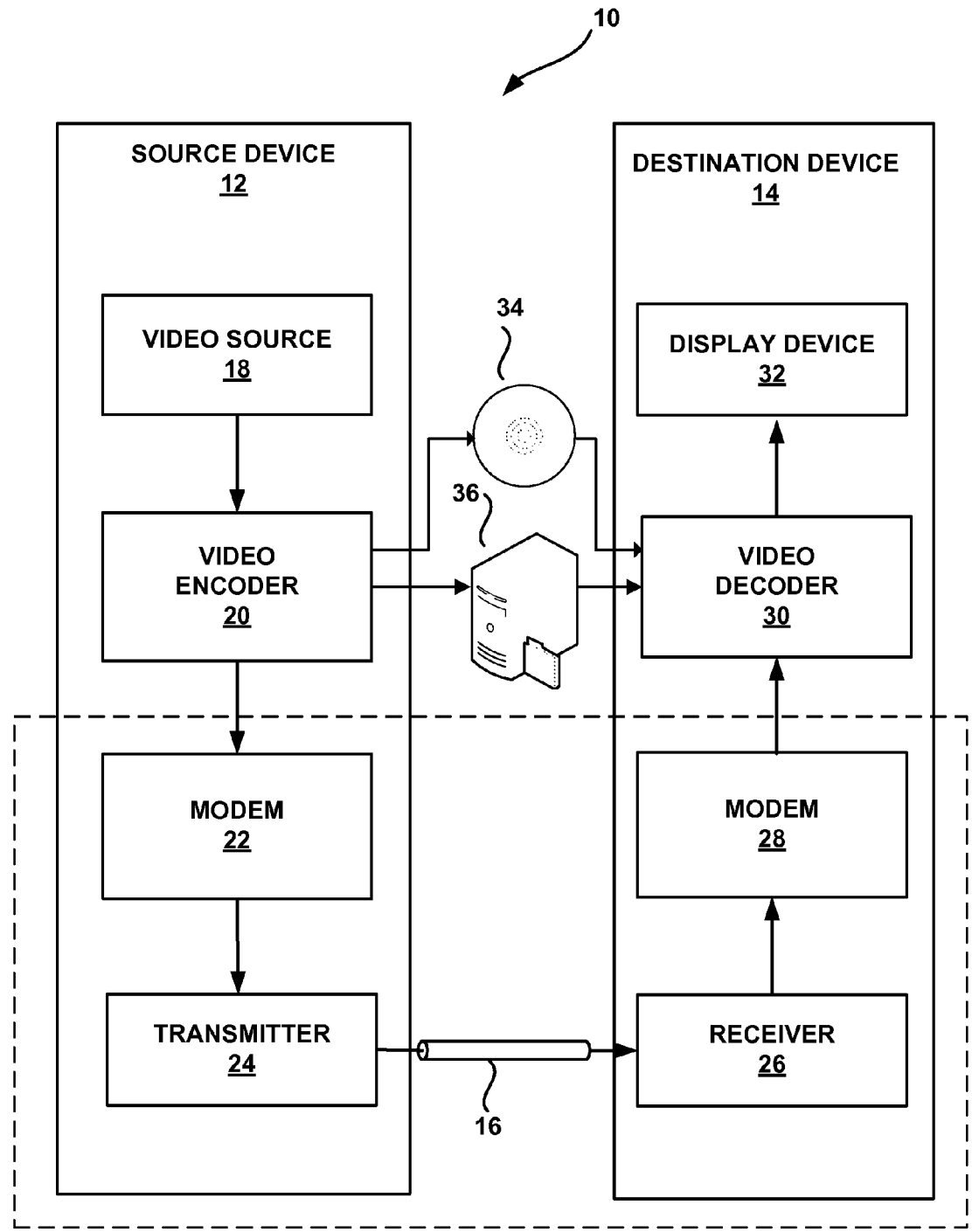
FIG. 2 is a block diagram illustrating an example video encoding and decoding system.

FIG. 2 is a block diagram illustrating an example video encoding and decoding system 10 that may be configured to utilize techniques for motion vector prediction in accordance with examples of this disclosure. As shown in FIG. 2, the system 10 includes a source device 12 that transmits encoded video to a destination device 14 via a communication channel 16. Encoded video data may also be stored on a storage medium 34 or a file server 36 and may be accessed by the destination device 14 as desired. When stored to a storage medium or file server, video encoder 20 may provide coded video data to another device, such as a network interface, a compact disc (CD), Blu-ray or digital video disc (DVD) burner or stamping facility device, or other devices, for storing the coded video data to the storage medium. Likewise, a device separate from video decoder 30, such as a network interface, CD or DVD reader, or the like, may retrieve coded video data from a storage medium and provided the retrieved data to video decoder 30.

The source device 12 and the destination device 14 may comprise any of a wide variety of devices, including desktop computers, notebook (i.e., laptop) computers, tablet computers, set-top boxes, telephone handsets such as so-called smartphones, televisions, cameras, display devices, digital media players, video gaming consoles, or the like. In many cases, such devices may be equipped for wireless communication. Hence, the communication channel 16 may comprise a wireless channel, a wired channel, or a combination of wireless and wired channels suitable for transmission of encoded video data. Similarly, the file server 36 may be accessed by the destination device 14 through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server.

Techniques for motion vector prediction, in accordance with examples of this disclosure, may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, the system 10 may be configured to support one-way or two-way video transmission to support applications such as video streaming, video playback, video broadcasting, and/or video telephony.

In the example of FIG. 2, the source device 12 includes a video source 18, a video encoder 20, a modulator/demodulator 22 and a transmitter 24. In the source device 12, the video source 18 may include a source such as a video capture device, such as a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called camera phones or video phones. However, the techniques described in this disclosure may be applicable to video coding in general, and may be applied to wireless and/or wired applications, or application in which encoded video data is stored on a local disk.

The captured, pre-captured, or computer-generated video may be encoded by the video encoder 20. The encoded video information may be modulated by the modem 22 according to a communication standard, such as a wireless communication protocol, and transmitted to the destination device 14 via the transmitter 24. The modem 22 may include various mixers, filters, amplifiers or other components designed for signal modulation. The transmitter 24 may include circuits designed for transmitting data, including amplifiers, filters, and one or more antennas.

The captured, pre-captured, or computer-generated video that is encoded by the video encoder 20 may also be stored onto a storage medium 34 or a file server 36 for later consumption. The storage medium 34 may include Blu-ray discs, DVDs, CD-ROMs, flash memory, or any other suitable digital storage media for storing encoded video. The encoded video stored on the storage medium 34 may then be accessed by the destination device 14 for decoding and playback.

The file server 36 may be any type of server capable of storing encoded video and transmitting that encoded video to the destination device 14. Example file servers include a web server (e.g., for a website), an FTP server, network attached storage (NAS) devices, a local disk drive, or any other type of device capable of storing encoded video data and transmitting it to a destination device. The transmission of encoded video data from the file server 36 may be a streaming transmission, a download transmission, or a combination of both. The file server 36 may be accessed by the destination device 14 through any standard data connection, including an Internet connection. This may include a wireless channel (e.g., a Wi-Fi connection), a wired connection (e.g., DSL, cable modem, Ethernet, USB, etc.), or a combination of both that is suitable for accessing encoded video data stored on a file server.

The destination device 14, in the example of FIG. 2, includes a receiver 26, a modem 28, a video decoder 30, and a display device 32. The receiver 26 of the destination device 14 receives information over the channel 16, and the modem 28 demodulates the information to produce a demodulated bitstream for the video decoder 30. The information communicated over the channel 16 may include a variety of syntax information generated by the video encoder 20 for use by the video decoder 30 in decoding video data. Such syntax may also be included with the encoded video data stored on the storage medium 34 or the file server 36. Each of the video encoder 20 and the video decoder 30 may form part of a respective encoder-decoder (CODEC) that is capable of encoding or decoding video data.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In the example of FIG. 2, the communication channel 16 may comprise any wireless or wired communication medium, such as a radio frequency (RF) spectrum or one or more physical transmission lines, or any combination of wireless and wired media. The communication channel 16 may form part of a packet-based network, such as a local area network, a wide-area network, or a global network such as the Internet. The communication channel 16 generally represents any suitable communication medium, or collection of different communication media, for transmitting video data from the source device 12 to the destination device 14, including any suitable combination of wired or wireless media. The communication channel 16 may include routers, switches, base stations, or any other equipment that may be useful to facilitate communication from the source device 12 to the destination device 14.

The video encoder 20 and the video decoder 30 may operate according to a video compression standard, such as the High Efficiency Video Coding (HEVC) standard presently under development, and may conform to the HEVC Test Model (HM). Alternatively, the video encoder 20 and the video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples include MPEG-2 and ITU-T H.263.

Although not shown in FIG. 2, in some aspects, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder (CODEC) in a respective device.

The video encoder 20 may implement any or all of the techniques of this disclosure for motion vector prediction in a video encoding process. Likewise, the video decoder 30 may implement any or all of these techniques motion vector prediction in a video coding process. A video coder, as described in this disclosure, may refer to a video encoder or a video decoder. Similarly, a video coding unit may refer to a video encoder or a video decoder. Likewise, video coding may refer to video encoding or video decoding.

In one example of the disclosure, the video encoder 20 of the source device 12 may be configured to determine one of a plurality of modes for a motion vector prediction process, and perform the motion vector prediction process for the current block of video data using the determined mode and a set of candidate blocks, wherein the set of candidate blocks is the same for each of the plurality of modes.

In another example of the disclosure, the video encoder 20 of the source device 12 may be configured to determine one of a plurality of modes for a motion vector prediction process for a current block of video data, and perform the motion vector prediction process for the current block using the determined mode and a set of candidate blocks, wherein the set of candidate blocks is the same for each of the plurality of modes, and wherein one candidate block in the set of candidate blocks is designated as an additional candidate block, and wherein the additional candidate block is used if another of the candidate blocks of the set of candidate blocks is unavailable In another example of the disclosure, the video decoder 30 of the destination device 14 may be configured to receive a syntax element indicating one of a plurality of modes for a motion vector prediction process for a current block of video data, and receive an index indicating a candidate block from a set of candidate blocks, wherein the set of candidate blocks is the same for each of the plurality of modes, and wherein information associated with the candidate block is used to decode a motion vector for the current block.

In another example of the disclosure, the video decoder 30 of the destination device 14 may be configured to receive a syntax element indicating one of a plurality of modes for a motion vector prediction process for a current block of video data, and receive an index indicating a candidate block from a set of candidate blocks, wherein the set of candidate blocks is the same for each of the plurality of modes, wherein one candidate block in the set of candidate blocks is designated as an additional candidate block, wherein the additional candidate block is used if another of the candidate blocks of the set of candidate blocks is unavailable, and wherein information associated with the candidate block is used to decode a motion vector for the current block.

Figure 3:
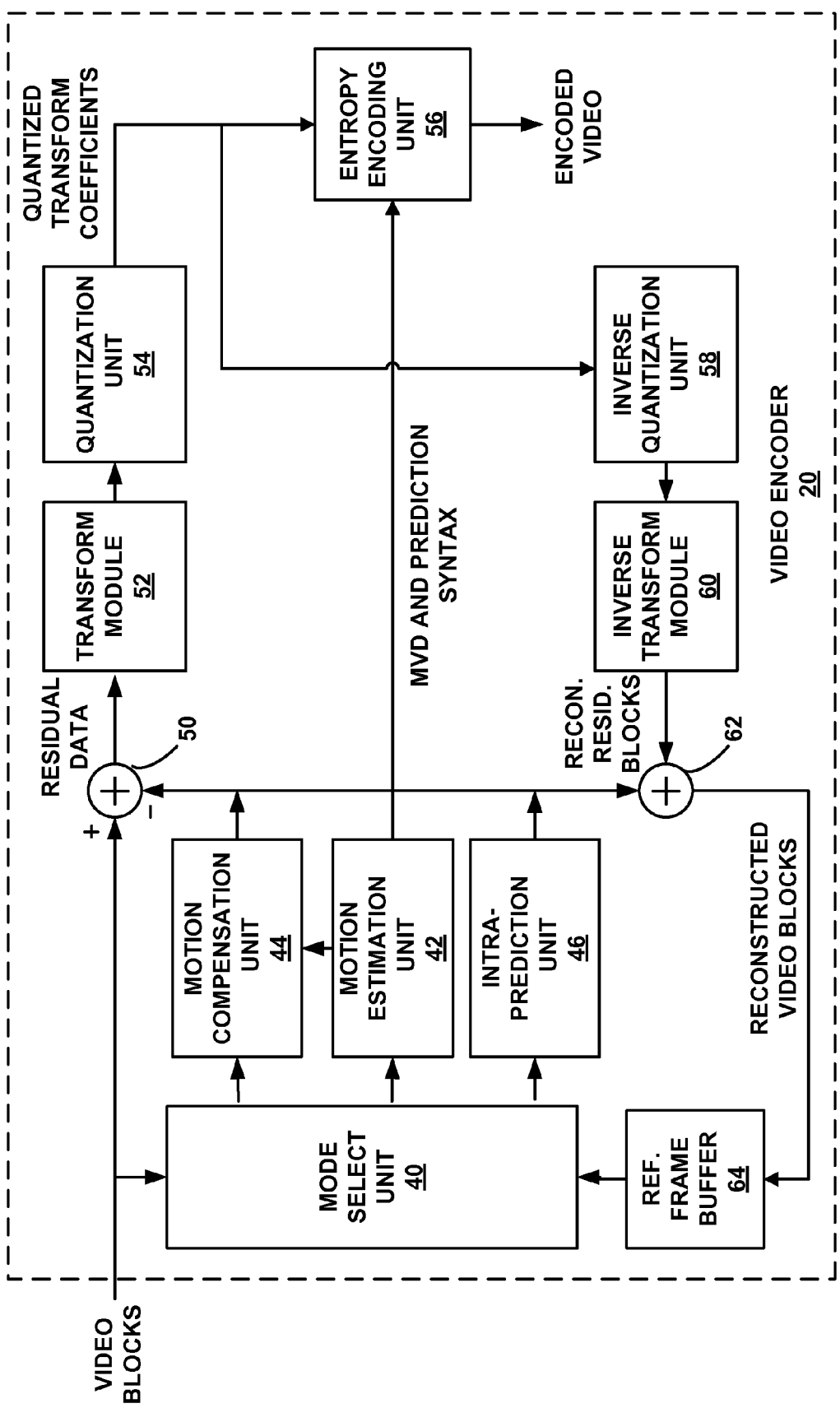
FIG. 3 is a block diagram illustrating an example video encoder.

FIG. 3 is a block diagram illustrating an example of a video encoder 20 that may use techniques for motion vector prediction as described in this disclosure. The video encoder 20 will be described in the context of HEVC coding for purposes of illustration, but without limitation of this disclosure as to other coding standards or methods that may require scanning of transform coefficients. The video encoder 20 may perform intra- and inter-coding of CUs within video frames. Intra-coding relies on spatial prediction to reduce or remove spatial redundancy in video data within a given video frame. Inter-coding relies on temporal prediction to reduce or remove temporal redundancy between a current frame and previously coded frames of a video sequence. Intra-mode (I-mode) may refer to any of several spatial-based video compression modes. Inter-modes such as uni-directional prediction (P-mode) or bi-directional prediction (B-mode) may refer to any of several temporal-based video compression modes.

As shown in FIG. 3, the video encoder 20 receives a current video block within a video frame to be encoded. In the example of FIG. 3, the video encoder 20 includes a motion compensation unit 44, a motion estimation unit 42, an intra-prediction unit 46, a reference frame buffer 64, a summer 50, a transform module 52, a quantization unit 54, and an entropy encoding unit 56. The transform module 52 illustrated in FIG. 3 is the structure or apparatus that applies the actual transform or combinations of transform to a block of residual data, and is not to be confused with block of transform coefficients, which may be referred to as a transform unit (TU) of a CU. For video block reconstruction, the video encoder 20 also includes an inverse quantization unit 58, an inverse transform module 60, and a summer 62. A deblocking filter (not shown in FIG. 3) may also be included to filter block boundaries to remove blockiness artifacts from reconstructed video. If desired, the deblocking filter would typically filter the output of the summer 62.

During the encoding process, the video encoder 20 receives a video frame or slice to be coded. The frame or slice may be divided into multiple video blocks, e.g., largest coding units (LCUs). The motion estimation unit 42 and the motion compensation unit 44 perform inter-predictive coding of the received video block relative to one or more blocks in one or more reference frames to provide temporal compression. The intra-prediction unit 46 may perform intra-predictive coding of the received video block relative to one or more neighboring blocks in the same frame or slice as the block to be coded to provide spatial compression.

The mode select unit 40 may select one of the coding modes, intra or inter, e.g., based on error (i.e., distortion) results for each mode, and provides the resulting intra- or inter-predicted block (e.g., a prediction unit (PU)) to the summer 50 to generate residual block data and to the summer 62 to reconstruct the encoded block for use in a reference frame. Summer 62 combines the predicted block with inverse quantized, inverse transformed data from inverse transform module 60 for the block to reconstruct the encoded block, as described in greater detail below. Some video frames may be designated as I-frames, where all blocks in an I-frame are encoded in an intra-prediction mode. In some cases, the intra-prediction unit 46 may perform intra-prediction encoding of a block in a P- or B-frame, e.g., when motion search performed by the motion estimation unit 42 does not result in a sufficient prediction of the block.

The motion estimation unit 42 and the motion compensation unit 44 may be highly integrated, but are illustrated separately for conceptual purposes. Motion estimation (or motion search) is the process of generating motion vectors, which estimate motion for video blocks. A motion vector, for example, may indicate the displacement of a prediction unit in a current frame relative to a reference sample of a reference frame. The motion estimation unit 42 calculates a motion vector for a prediction unit of an inter-coded frame by comparing the prediction unit to reference samples of a reference frame stored in the reference frame buffer 64. A reference sample may be a block that is found to closely match the portion of the CU including the PU being coded in terms of pixel difference, which may be determined by sum of absolute difference (SAD), sum of squared difference (SSD), or other difference metrics. The reference sample may occur anywhere within a reference frame or reference slice. In some examples, the reference sample may occur at a fractional pixel location.

The portion of the reference frame identified by a motion vector may be referred to as a reference sample. The motion compensation unit 44 may calculate a prediction value for a prediction unit of a current CU, e.g., by retrieving the reference sample identified by a motion vector for the PU. In some video encoding techniques, the motion estimation unit 42 sends the calculated motion vector, reference frame, and prediction direction (i.e., the direction in terms of whether the reference frame temporally precedes or follows the current frame) to the entropy encoding unit 56 and the motion compensation unit 44. Other video encoding techniques utilize a motion vector prediction process to encode the motion vector. The motion vector prediction process may be chosen from among a plurality of modes, including a merge mode and an AMVP mode.

Figure 4A:
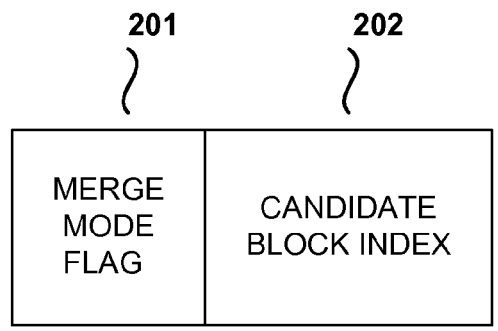
FIG. 4A is a conceptual drawing of signaling information for merge mode.

In merge mode, the encoder considers a set of candidate blocks and selects a block that has the same (or most closely matches) motion vector, reference frame, and prediction direction as the current block. This is accomplished by checking each candidate block in turn and choosing the one that yields the best rate-distortion performance once its motion vector, reference frame, and prediction direction are copied to the current block. Then, rather than signaling this motion vector information (i.e., the motion vector, reference frame, and prediction direction) in the encoded video bitstream, the encoder signals an index number for the selected candidate block. A decoder may copy the motion vector information from the candidate block indicated by the signaled index number and use the copied motion vector information for a current block. FIG. 4A shows an example of merge mode signaling. A merge flag 201 indicates that merge mode is being used. Candidate block index 202 indicates which of the candidate blocks from the set of candidate blocks defined for merge mode is to be used to retrieve motion vector information for the current block.

It should be noted that in certain cases to meet the specified number of candidates for the merge mode candidate set, some "artificial" motion vector information may be generated to fill in the candidate set. The "artificial" motion vector information may be generated through partial combinations of motion vector information from different candidate blocks. For example, the List 0 motion vector from candidate block 1 may be combined with the List 1 motion vector from candidate 2, together with reference frame index and prediction direction, to form new motion vector information in the candidate set. In some other examples, zero motion vectors may also be added as additional motion vector information to fill in the candidate set. However, regardless of how the candidate set is formed, in merge mode, only an index into the candidate set needs to be signaled to decoder to indicate which candidate is selected to provide motion vector information for a current block. At the decoder side, the same candidate set is formed and motion vector information can be identified through the signaled index into the candidate set.

Figure 4B:
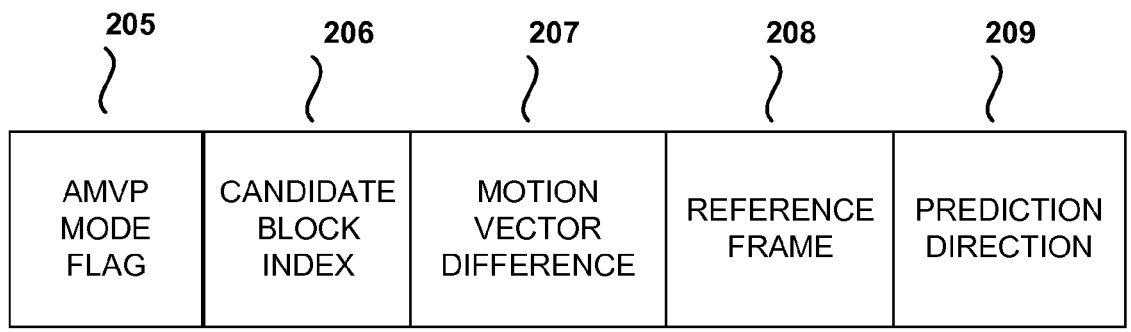
FIG. 4B is a conceptual drawing of signaling information for AMVP mode.

In AMVP mode, the encoder considers a set of candidate blocks and selects a block that produces a motion vector difference (i.e., a difference between the motion vector of a respective candidate block and the actual motion vector of the current block) that results in the best rate-distortion or meets some predetermined threshold (e.g., a rate-distortion threshold). The AMVP mode may consider the candidate blocks in a checking pattern until a satisfactory candidate is found and chosen. Alternatively, in some examples, all candidate blocks could be checked, and a candidate block yielding the best result is selected as the MVP for the block to be coded. The encoder may then signal an index for the candidate block used to produce the motion vector difference along with the motion vector difference. A decoder may then recreate the motion vector for the current block by adding the received motion vector difference to the motion vector retrieved from the candidate block indicated by the signaled index. FIG. 4B shows an example of AMVP mode signaling. An AMVP mode flag 205 indicates that AMVP mode is being used. Candidate block index 206 indicates which of the candidate blocks from the set of candidate blocks defined for AMVP mode is to be used to retrieve a motion vector. AMVP mode also signals the motion vector difference 207, the reference frame 208 and the prediction direction 209. In some examples, instead of explicitly signaling the reference frame and the prediction direction, the reference frame and prediction direction are instead retrieved from motion vector information associated with the candidate block.

In the examples described above, signaling the motion vector information in the encoded bitstream does not require real-time transmission of such elements from the encoder to a decoder, but rather means that such information is encoded into the bitstream and are made accessible to the decoder in any fashion. This may include real-time transmission (e.g., in video conferencing) as well as storing the encoded bitstream on a computer-readable medium for future use by a decoder (e.g., in streaming, downloading, disk access, card access, DVD, Blu-ray, etc.).

In accordance with examples of this disclosure, the merge mode and the AMVP mode utilize the same set of candidate blocks (i.e., in terms of both number and location of the blocks). As such, both the encoder and decoder may reduce the amount of memory needed to store motion vector information for the candidate blocks. It may also reduce the memory bandwidth requirement in retrieving those motion vectors during the coding process of a current block.

Figure 5A:
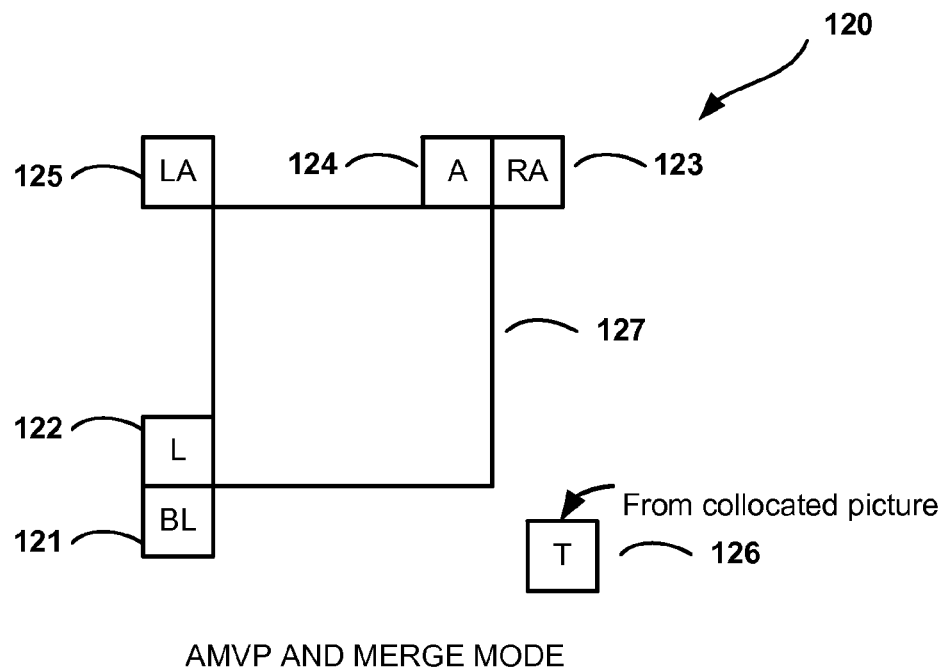
FIG. 5A is a conceptual drawing illustrating candidate blocks for an AMVP and a merge mode in accordance with one example of the disclosure.

In a first example of the disclosure, the merge mode and the AMVP mode both use the same set of candidate blocks 120 shown in FIG. 5A. In this example, merge mode would now use six candidate blocks instead of five. However, the total number of candidate blocks for both merge mode and AMVP mode is reduced, as both modes use candidate blocks in the same locations. In this example, the candidate blocks are in the below left (BL) 121, left (L) 122, left above (LA) 125, above (A) 124, right above (RA) 123, and temporal (T) 126 positions as shown in FIG. 5A. In this example, the left candidate block 122 is adjacent the left edge of the current block 127. The lower edge of the left block 122 is aligned with the lower edge of the current block 127. The above block 124 is adjacent the upper edge of the current block 127. The right edge of the above block 124 is aligned with the right edge of the current block 127.

Figure 5B:
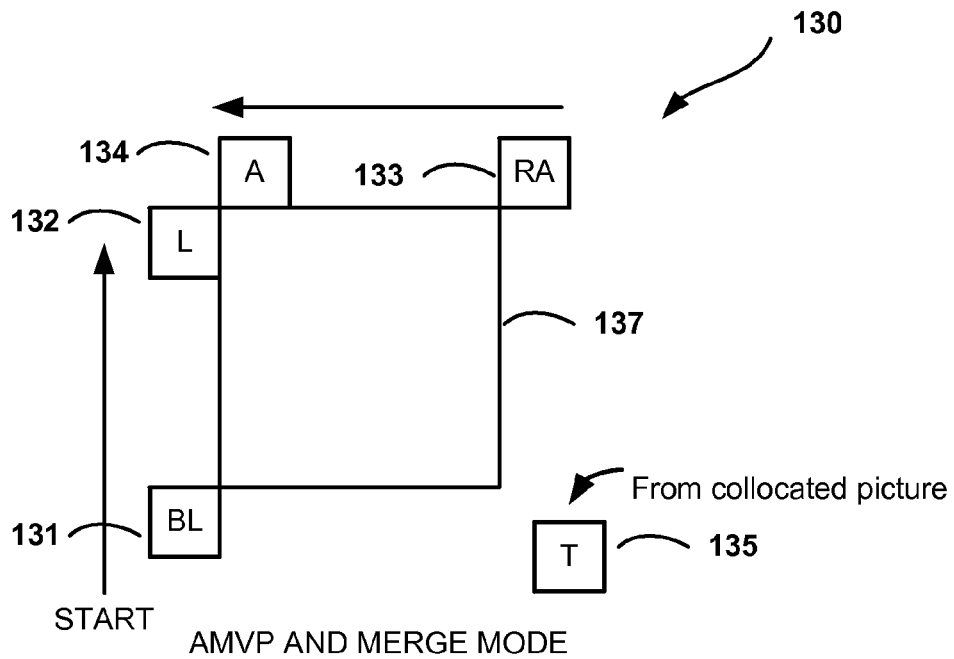
FIG. 5B is a conceptual drawing illustrating candidate blocks for an AMVP and a merge mode in accordance with another example of the disclosure.

In a second example of the disclosure, the AMVP mode and the merge mode use the set of candidate blocks 130 shown in FIG. 5B. In this example, the number of candidate blocks for the AMVP mode is reduced to 5. Further reduction of candidate blocks is achieved, as both merge mode and AMVP mode now use candidate blocks in the same locations. In this example, the candidate blocks are in the below left (BL) 131, left (L) 132, above (A) 134, right above (RA) 133, and temporal (T) 135 locations. Note that the locations of the above block 134 and left block 132 differ from the locations of the above block 124 and left block 122 in the example of FIG. 5A. In this example, the left candidate block 132 is adjacent the left edge of the current block 137. The upper edge of the left block 132 is aligned with the upper edge of the current block 137. The above block 134 is adjacent the upper edge of the current block 137. The left edge of the above block 134 is aligned with the left edge of the current block 137. In one example, the checking pattern for AMVP mode proceeds as follows: BL-L-RA-A-T.

Figure 6:
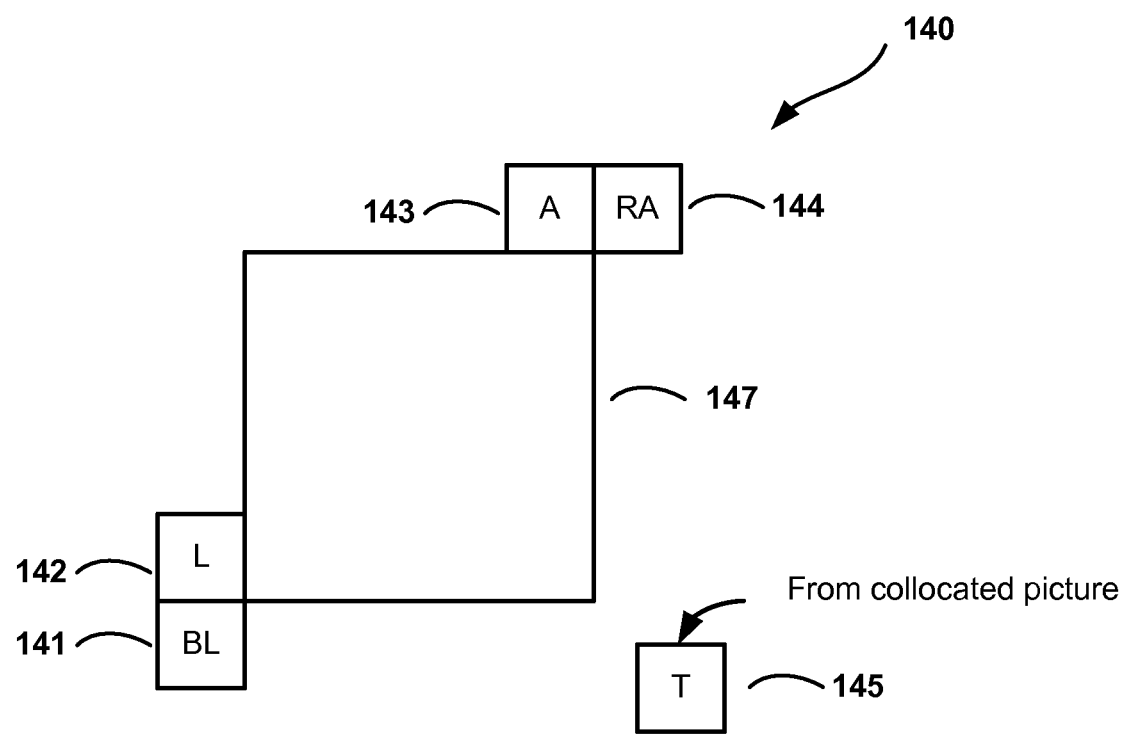
FIG. 6 is a conceptual drawing illustrating candidate blocks for an AMVP and a merge mode in accordance with another example of the disclosure.

In a third example of the disclosure, the merge mode and the AMVP mode use the set of candidate blocks 140 shown in FIG. 6. In this example, the number of candidate blocks is reduced; both by reducing the total number for each mode to 5, as well as by unifying the candidate block locations for both modes. In this example, the candidate blocks are in the below left (BL) 141, left (L) 142, above (A) 143, right above (RA) 144, and temporal (T) 145. In this example, the left candidate block 142 is adjacent the left edge of the current block 147. The lower edge of the left block 142 is aligned with the lower edge of the current block 147. The above block 143 is adjacent the upper edge of the current block 147. The right edge of the above block 143 is aligned with the right edge of the current block 147.

Figure 7:
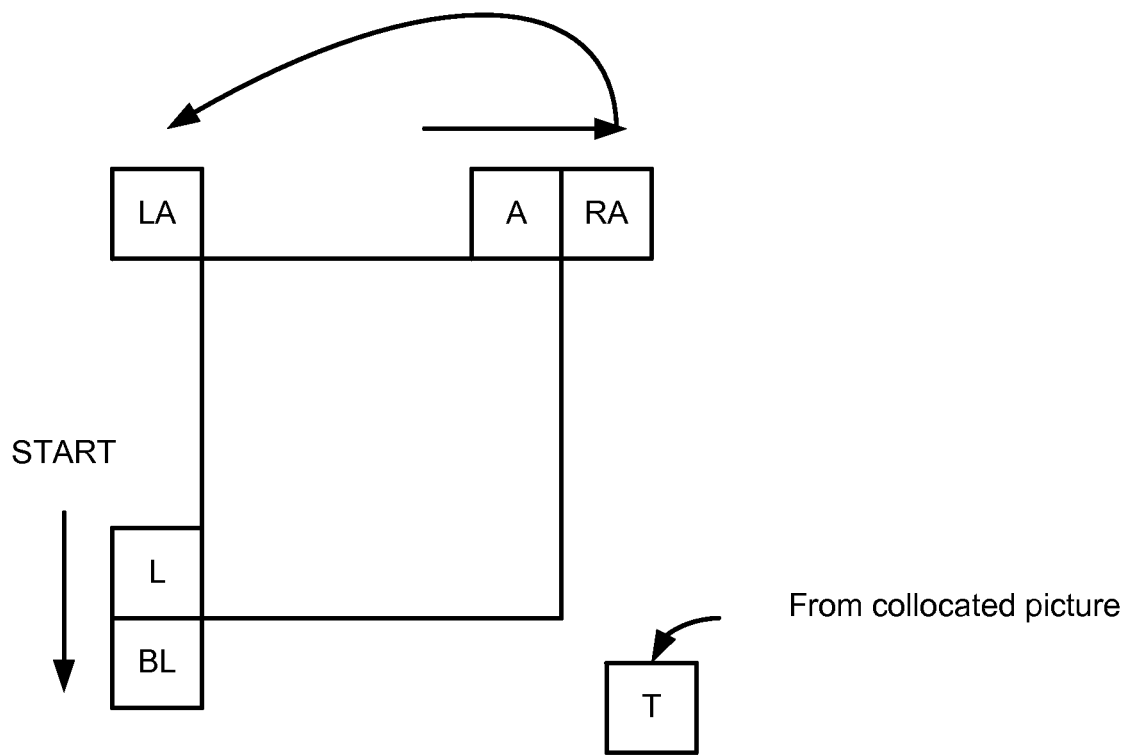
FIG. 7 is a conceptual drawing illustrating candidate blocks and a checking pattern for an AMVP and a merge mode in accordance with another example of the disclosure.

In another example, the disclosure describes an improved checking pattern for AMVP mode. As shown in FIG. 7, for example, the checking pattern proceeds as follows: L-BL-A-RA-LA-T. Rather than starting at the BL candidate block, as shown in FIG. 1A, the example in FIG. 7 starts at the L candidate block. The left side blocks are generally more correlated to the current block, as video content typically moves in a horizontal direction. The L candidate block is checked first, because the BL candidate block may not be available (i.e., may not have already been coded) in all situations. In addition, the A candidate block is checked before the RA candidate block, as the motion vector of the A candidate block has been shown to have a higher statistical correlation to the motion vector of the current block than that of the RA candidate block.

Merge mode may use the same checking pattern shown in FIG. 7, or may use a different checking pattern. As one example, the checking pattern for merge mode may proceed as follows: L-A-RA-BL-(LA)-T. In this example, the inclusion of the LA block is optional or adaptive depending on if one of the first four candidate blocks is unavailable.

The example of FIG. 7 is shown with reference to the set of candidate blocks of FIG. 5A. However, this checking pattern may be applicable with any candidate set. In general, the left candidate block should be checked before the below left candidate block. Next, the above candidate block should be checked before the right above candidate block. Any remaining candidate blocks may then be checked in any order. In some examples, the temporal candidate block may be checked last.

In another example of the disclosure, flexible additional candidates for both merge mode and AMVP are disclosed. As shown in the example of FIG. 5A, there are five spatial candidate blocks (i.e., L, BL, A, RA, and LA) and one temporal candidate block (i.e., T), for a total of six candidate blocks. In a previous proposal to the HEVC standard, the maximum number of candidate blocks for merge mode is five. As such, one of the candidate blocks shown in FIG. 5A may be eliminated for merge mode. In one example, the LA candidate block may be defined as an additional candidate block (i.e., it is initially not considered as part of the set of candidate blocks for merge mode).

However, as mentioned above, not all candidate blocks are available in all situations. For example, the BL candidate block may not have been coded yet at the time the current block is coded. In addition, the data for some candidate blocks may become corrupted or may not have been received at all (e.g., in real-time decoding). As such, this disclosure proposes utilizing additional candidate blocks in situations where a candidate block in the set is found to be unavailable. In this way, the total number of candidates is kept at the maximum limit without wasting a check on an unavailable candidate.

In one example, the L and BL candidates are first checked by the encoder or decoder, as applicable. If one of these candidate blocks is not valid (e.g., is corrupted) or not available, an additional candidate block (e.g., LA) may be used instead. If both the L and BL candidate blocks are valid, the A and RA candidate blocks are checked. If one of these candidate blocks is not valid or not available, the LA candidate block may be used instead. If both the A and RA candidate blocks are valid, the LA candidate block will not be used. In this example, the LA candidate block is used as the additional candidate block. However, any additional candidate block in any causal position (i.e., in a position, relative to the current block, where the candidate block has already been coded) relative to the current block may be used.

In another example, all candidate blocks shown in FIG. 5A will be used. For a merge mode where the maximum number of candidate blocks is N (where N is less than 6), the first N available candidate blocks in a checking pattern will be used as the candidate blocks for the merge mode. In the example of FIG. 5A, there are six candidate bocks with a checking pattern of L-A-RA-BL-LA-T. The first N available candidate blocks in the checking pattern will form the final set of candidate blocks for the merge mode. In this example, the checking pattern is fixed. In another example, the checking pattern can be selected based on block size, partition size, and/or partition index. In another example, the checking pattern can be updated adaptively during encoding and decoding. The update can depend on merge index, motion vector prediction mode, partition size, partition index, and/or motion vector information (e.g., reference index, motion vector difference, motion vector predictor) of previously encoded/decoded blocks.

According to another example, the techniques of utilizing an additional candidate block may also be applied to AMVP mode. AMVP mode in the current working draft of the HEVC standard already allows for checking all six candidate blocks shown in FIG. 5A. However, as mentioned above, some of these candidate blocks may be unavailable or invalid. In such a case, an additional merge candidate may be defined. Such a merge candidate may be in any position that is causal to the current PU.

Returning to FIG. 3, the intra-prediction unit 46 may perform intra-prediction on the received block, as an alternative to inter-prediction performed by the motion estimation unit 42 and the motion compensation unit 44. The intra-prediction unit 46 may predict the received block relative to neighboring, previously coded blocks, e.g., blocks above, above and to the right, above and to the left, or to the left of the current block, assuming a left-to-right, top-to-bottom encoding order for blocks. The intra-prediction unit 46 may be configured with a variety of different intra-prediction modes. For example, the intra-prediction unit 46 may be configured with a certain number of directional prediction modes, e.g., thirty-four directional prediction modes, based on the size of the CU being encoded.

The intra-prediction unit 46 may select an intra-prediction mode by, for example, calculating prediction error values for various intra-prediction modes and selecting a mode that yields the lowest error value. Directional prediction modes may include functions for combining values of spatially neighboring pixels and applying the combined values to one or more pixel positions in a PU. Once values for all pixel positions in the PU have been calculated, the intra-prediction unit 46 may calculate an error value for the prediction mode based on pixel differences between the calculated or predicted values of the PU and the received original block to be encoded. The intra-prediction unit 46 may continue testing intra-prediction modes until an intra-prediction mode that yields an acceptable error value is discovered. The intra-prediction unit 46 may then send the PU to the summer 50.

The video encoder 20 forms a residual block by subtracting the prediction data calculated by the motion compensation unit 44 or the intra-prediction unit 46 from the original video block being coded. The summer 50 represents the component or components that perform this subtraction operation. The residual block may correspond to a two-dimensional matrix of pixel difference values, where the number of values in the residual block is the same as the number of pixels in the PU corresponding to the residual block. The values in the residual block may correspond to the differences, i.e., error, between values of co-located pixels in the PU and in the original block to be coded. Such an operation is applied to both luma and chroma components, so the differences may be chroma or luma differences depending on the type of block that is coded.

The transform module 52 may form one or more transform units (TUs) from the residual block. The transform module 52 selects a transform from among a plurality of transforms. The transform may be selected based on one or more coding characteristics, such as block size, coding mode, or the like. The transform module 52 then applies the selected transform to the TU, producing a video block comprising a two-dimensional array of transform coefficients.

The transform module 52 may send the resulting transform coefficients to the quantization unit 54. The quantization unit 54 may then quantize the transform coefficients. The entropy encoding unit 56 may then perform a scan of the quantized transform coefficients in the matrix according to a scanning mode. This disclosure describes the entropy encoding unit 56 as performing the scan. However, it should be understood that, in other examples, other processing units, such as the quantization unit 54, could perform the scan.

Once the transform coefficients are scanned into the one-dimensional array, the entropy encoding unit 56 may apply entropy coding such as context adaptive variable length coding (CAVLC), context adaptive binary arithmetic coding (CABAC), syntax-based context-adaptive binary arithmetic coding (SBAC), or another entropy coding methodology to the coefficients. Entropy coding may also be applied to syntax elements, such as syntax elements used in merge mode and AMVP mode.

To perform CAVLC, the entropy encoding unit 56 may select a variable length code for a symbol to be transmitted. Codewords in VLC may be constructed such that relatively shorter codes correspond to more likely symbols, while longer codes correspond to less likely symbols. In this way, the use of VLC may achieve a bit savings over, for example, using equal-length codewords for each symbol to be transmitted.

To perform CABAC, the entropy encoding unit 56 may select a context model to apply to a certain context to encode symbols to be transmitted. In the case of transform coefficients, the context may relate to, for example, whether neighboring values are non-zero or not. The entropy encoding unit 56 may also entropy encode syntax elements, such as the signal representative of the selected transform. In accordance with the techniques of this disclosure, the entropy encoding unit 56 may select the context model used to encode these syntax elements based on, for example, an intra-prediction direction for intra-prediction modes, a scan position of the coefficient corresponding to the syntax elements, block type, and/or transform type, among other factors used for context model selection.

Following the entropy coding by the entropy encoding unit 56, the resulting encoded video may be transmitted to another device, such as the video decoder 30, or archived for later transmission or retrieval.

In some cases, the entropy encoding unit 56 or another unit of the video encoder 20 may be configured to perform other coding functions, in addition to entropy coding. For example, the entropy encoding unit 56 may be configured to determine coded block pattern (CBP) values for CU's and PU's. Also, in some cases, the entropy encoding unit 56 may perform run length coding of coefficients.

The inverse quantization unit 58 and the inverse transform module 60 apply inverse quantization and inverse transformation, respectively, to reconstruct the residual block in the pixel domain, e.g., for later use in reconstructing a reference block. The motion compensation unit 44 may calculate a reference block by adding the residual block to a predictive block formed from one of the frames of the reference frame buffer 64. The motion compensation unit 44 may also apply one or more interpolation filters to the reconstructed reference block to calculate sub-integer pixel values for use in motion estimation. The summer 62 adds the reconstructed residual block to the motion compensated prediction block produced by the motion compensation unit 44 to produce a reconstructed video block for storage in the reference frame buffer 64. The reconstructed video block may be used by the motion estimation unit 42 and the motion compensation unit 44 as a reference block to inter-code a block in a subsequent video frame.

Figure 8:
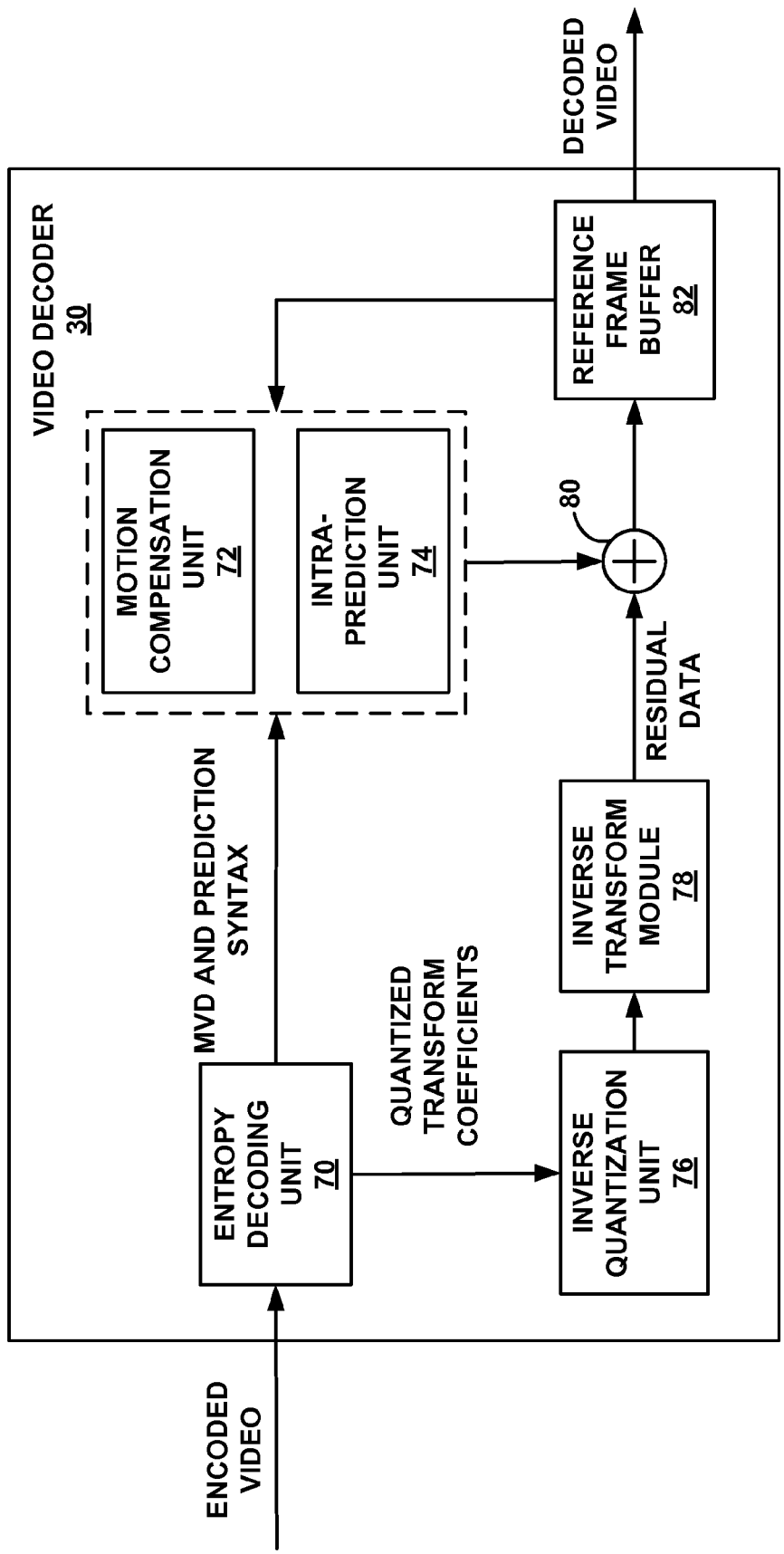
FIG. 8 is a block diagram illustrating an example video decoder.

FIG. 8 is a block diagram illustrating an example of a video decoder 30, which decodes an encoded video sequence. In the example of FIG. 8, the video decoder 30 includes an entropy decoding unit 70, a motion compensation unit 72, an intra-prediction unit 74, an inverse quantization unit 76, an inverse transform module 78, a reference frame buffer 82 and a summer 80. The video decoder 30 may, in some examples, perform a decoding pass generally reciprocal to the encoding pass described with respect to the video encoder 20 (see FIG. 3).

The entropy decoding unit 70 performs an entropy decoding process on the encoded bitstream to retrieve a one-dimensional array of transform coefficients. The entropy decoding process used depends on the entropy coding used by the video encoder 20 (e.g., CABAC, CAVLC, etc.). The entropy coding process used by the encoder may be signaled in the encoded bitstream or may be a predetermined process.

In some examples, the entropy decoding unit 70 (or the inverse quantization unit 76) may scan the received values using a scan mirroring the scanning mode used by the entropy encoding unit 56 (or the quantization unit 54) of the video encoder 20. Although the scanning of coefficients may be performed in the inverse quantization unit 76, scanning will be described for purposes of illustration as being performed by the entropy decoding unit 70. In addition, although shown as separate functional units for ease of illustration, the structure and functionality of the entropy decoding unit 70, the inverse quantization unit 76, and other units of the video decoder 30 may be highly integrated with one another.

The inverse quantization unit 76 inverse quantizes, i.e., de-quantizes, the quantized transform coefficients provided in the bitstream and decoded by the entropy decoding unit 70. The inverse quantization process may include a conventional process, e.g., similar to the processes proposed for HEVC or defined by the H.264 decoding standard. The inverse quantization process may include use of a quantization parameter QP calculated by the video encoder 20 for the CU to determine a degree of quantization and, likewise, a degree of inverse quantization that should be applied. The inverse quantization unit 76 may inverse quantize the transform coefficients either before or after the coefficients are converted from a one-dimensional array to a two-dimensional array.

The inverse transform module 78 applies an inverse transform to the inverse quantized transform coefficients. In some examples, the inverse transform module 78 may determine an inverse transform based on signaling from the video encoder 20, or by inferring the transform from one or more coding characteristics such as block size, coding mode, or the like. In some examples, the inverse transform module 78 may determine a transform to apply to the current block based on a signaled transform at the root node of a quadtree for an LCU including the current block. Alternatively, the transform may be signaled at the root of a TU quadtree for a leaf-node CU in the LCU quadtree. In some examples, the inverse transform module 78 may apply a cascaded inverse transform, in which inverse transform module 78 applies two or more inverse transforms to the transform coefficients of the current block being decoded.

The intra-prediction unit 74 may generate prediction data for a current block of a current frame based on a signaled intra-prediction mode and data from previously decoded blocks of the current frame.

According to examples of this disclosure, the video decoder 30 may receive, from the encoded bitstream, prediction syntax that identifies the motion vector prediction mode and associated motion vector information (e.g., see FIGS. 4A and 4B and related discussion). In particular, the video decoder 30 may receive an index indicating a candidate block from a set of candidate blocks, wherein the set of candidate blocks is the same for each of the plurality of modes, and wherein information associated with the candidate block is used to decode a motion vector for the current block. The set of candidate blocks may be the sets shown in FIG. 5A, FIG. 5B, or FIG. 6, or any other set of candidate blocks causal to the current block.

In the case that the syntax element indicates the merge mode, the video decoder is further configured to retrieve a motion vector, a reference frame, and a prediction direction associated with the candidate block having the received index, and to perform an inter-prediction process for the current block using the retrieved motion vector, reference frame, and prediction direction.

In the case that the syntax element indicates the adaptive motion vector prediction (AMVP) mode, the video decoder is further configured to receive a reference frame index, a motion vector difference, and a syntax element indicating a prediction direction, retrieve a candidate motion vector associated with the candidate block having the received index, calculate a motion vector for the current block using the candidate motion vector and the motion vector difference, and perform an inter-prediction process using the calculated motion vector, the received reference frame index, and the received prediction direction.

Regardless of the prediction mode, once the prediction direction, reference frame index, and motion vector are determined for the current block, the motion compensation unit produces a motion compensated block for the current block. These motion compensated blocks essentially recreate the predictive block used to produce the residual data.

The motion compensation unit 72 may produce the motion compensated blocks, possibly performing interpolation based on interpolation filters. Identifiers for interpolation filters to be used for motion estimation with sub-pixel precision may be included in the syntax elements. The motion compensation unit 72 may use interpolation filters as used by the video encoder 20 during encoding of the video block to calculate interpolated values for sub-integer pixels of a reference block. The motion compensation unit 72 may determine the interpolation filters used by the video encoder 20 according to received syntax information and use the interpolation filters to produce predictive blocks.

Additionally, the motion compensation unit 72 and the intra-prediction unit 74, in an HEVC example, may use some of the syntax information (e.g., provided by a quadtree) to determine sizes of LCUs used to encode frame(s) of the encoded video sequence. The motion compensation unit 72 and the intra-prediction unit 74 may also use syntax information to determine split information that describes how each CU of a frame of the encoded video sequence is split (and likewise, how sub-CUs are split). The syntax information may also include modes indicating how each CU is encoded (e.g., intra- or inter-prediction, and for intra-prediction an intra-prediction encoding mode), one or more reference frames (and/or reference lists containing identifiers for the reference frames) for each inter-encoded PU, and other information to decode the encoded video sequence.

The summer 80 combines the residual blocks with the corresponding prediction blocks generated by the motion compensation unit 72 or the intra-prediction unit 74 to form decoded blocks. The decoded blocks, in effect, reconstruct the originally coded blocks, subject to loss due to quantization or other coding aspects. If desired, a deblocking filter may also be applied to filter the decoded blocks in order to remove blockiness artifacts. The decoded video blocks are then stored in the reference frame buffer 82, which provides reference blocks for subsequent motion compensation and also produces decoded video for presentation on a display device (such as the display device 32 of FIG. 2).

As mentioned above, the techniques of this disclosure are applicable for both an encoder and a decoder. In general, and in accordance with the description above, an encoder utilizes the same set of candidate blocks to perform a motion vector prediction process (e.g., a merge mode and an AMVP mode). A decoder may then decode the motion vector based on syntax elements received using the same set of candidate blocks used by the encoder. By unifying the candidate blocks for all motion vector prediction modes, the amount of memory needed to store motion vector information (e.g., motion vector, prediction direction, reference frame indices, etc.) is reduced. The memory bandwidth requirement in retrieving the motion vector information from those candidate blocks can also be reduced.

Figure 9:
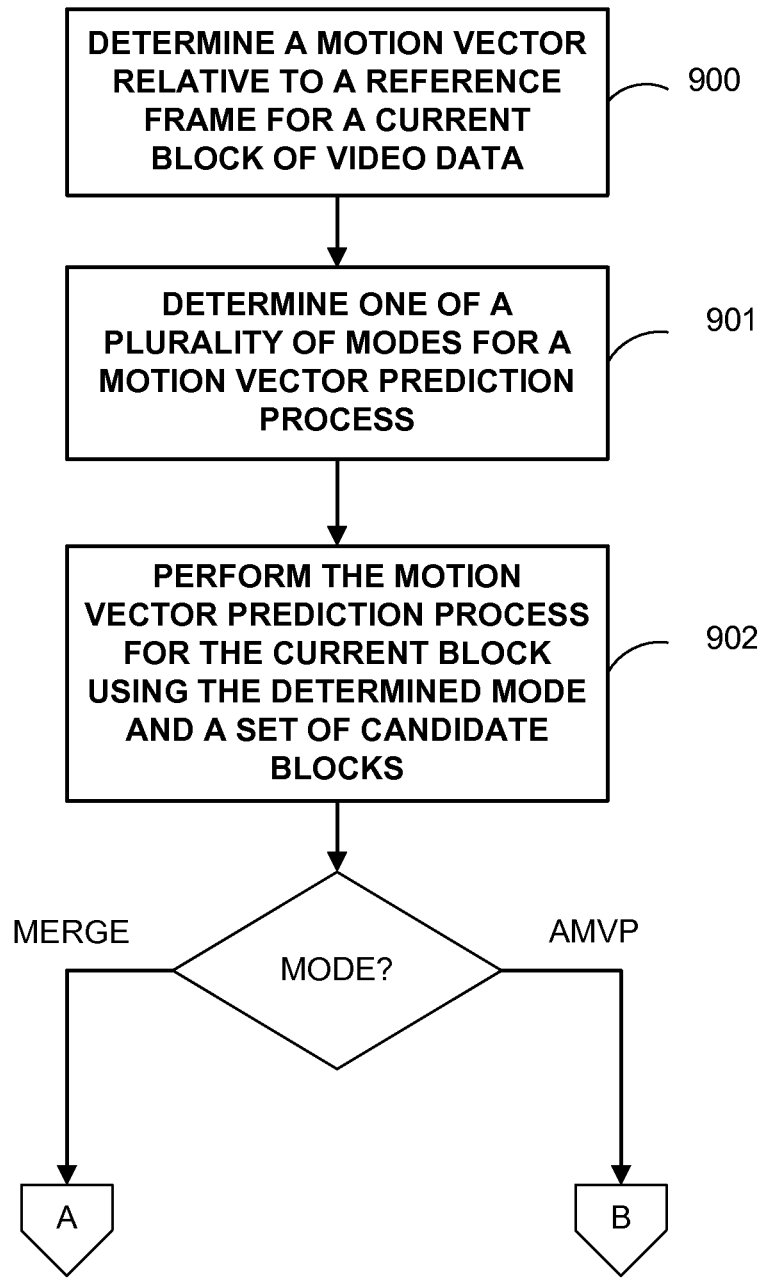
FIG. 9 is a flowchart illustrating an example method of encoding video.

FIG. 9 is a flowchart illustrating an example method of encoding video, which may be performed by a video encoder, such as the video encoder 20 of FIG. 3. Video encoder 20 may be configured to determine a motion vector relative to a reference frame for a current block of video data (900). The video encoder 20 may also determine one of a plurality of modes (e.g., merge mode or AMVP) for a motion vector prediction process (901), and perform the motion vector prediction process for the current block of video data using the determined mode and a set of candidate blocks. The set of candidate blocks is the same for each of the plurality of modes.

Figure 10:
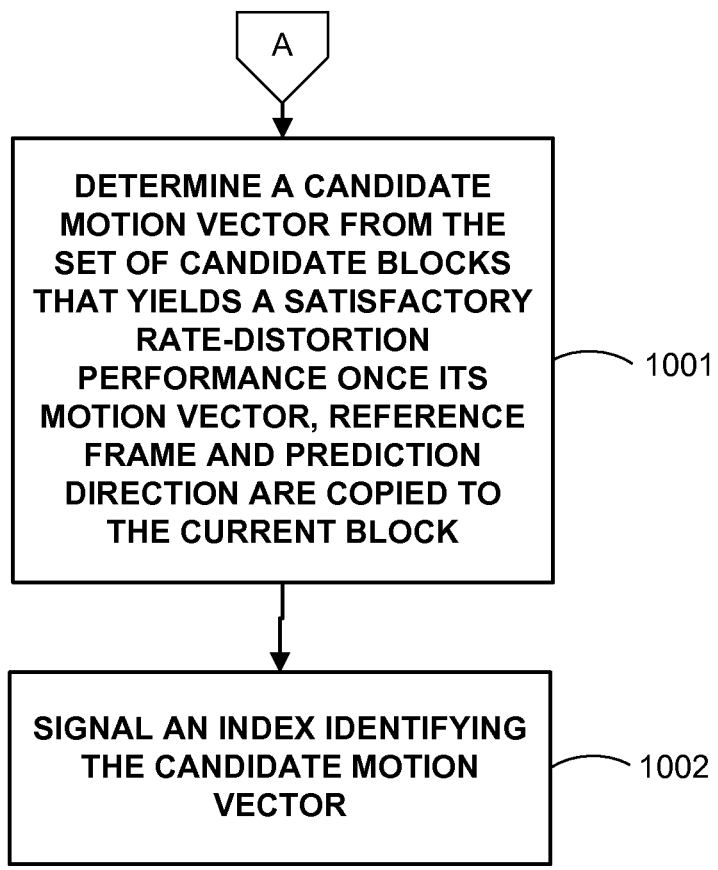
FIG. 10 is a flowchart illustrating an example method of encoding video in a merge mode.

The plurality of modes may include a merge mode and an adaptive motion vector prediction mode. FIG. 10 illustrates an example method of encoding video when the motion vector prediction process is in the merge mode. In this case, the video encoder is further configured to determine a candidate motion vector from the set of candidate blocks that yields a satisfactory rate-distortion performance once its motion vector, reference frame, and prediction direction are copied to the current block (1001) and signal an index identifying the candidate motion vector (1002).

In one example, the set of candidate blocks may include an above candidate block, a right above candidate block, a left candidate block, a below left candidate block, and a temporal candidate block. The left candidate block is adjacent a left edge of the current block and a top edge of the left candidate block is aligned with a top edge of the current block. The above candidate block is adjacent the top edge of the current block and a left edge of the above candidate block is aligned with the left edge of the current block.

In other example, the left candidate block is adjacent a left edge of the current block and a bottom edge of the left candidate block is aligned with a bottom edge of the current block. The above candidate block is adjacent a top edge of the current block and a right edge of the above candidate block is aligned with a right edge of the current block.

In another example, the set of candidate blocks includes a left above candidate block, an above candidate block, a right above candidate block, a left candidate block, a below left candidate block, and a temporal candidate block.

Figure 11:
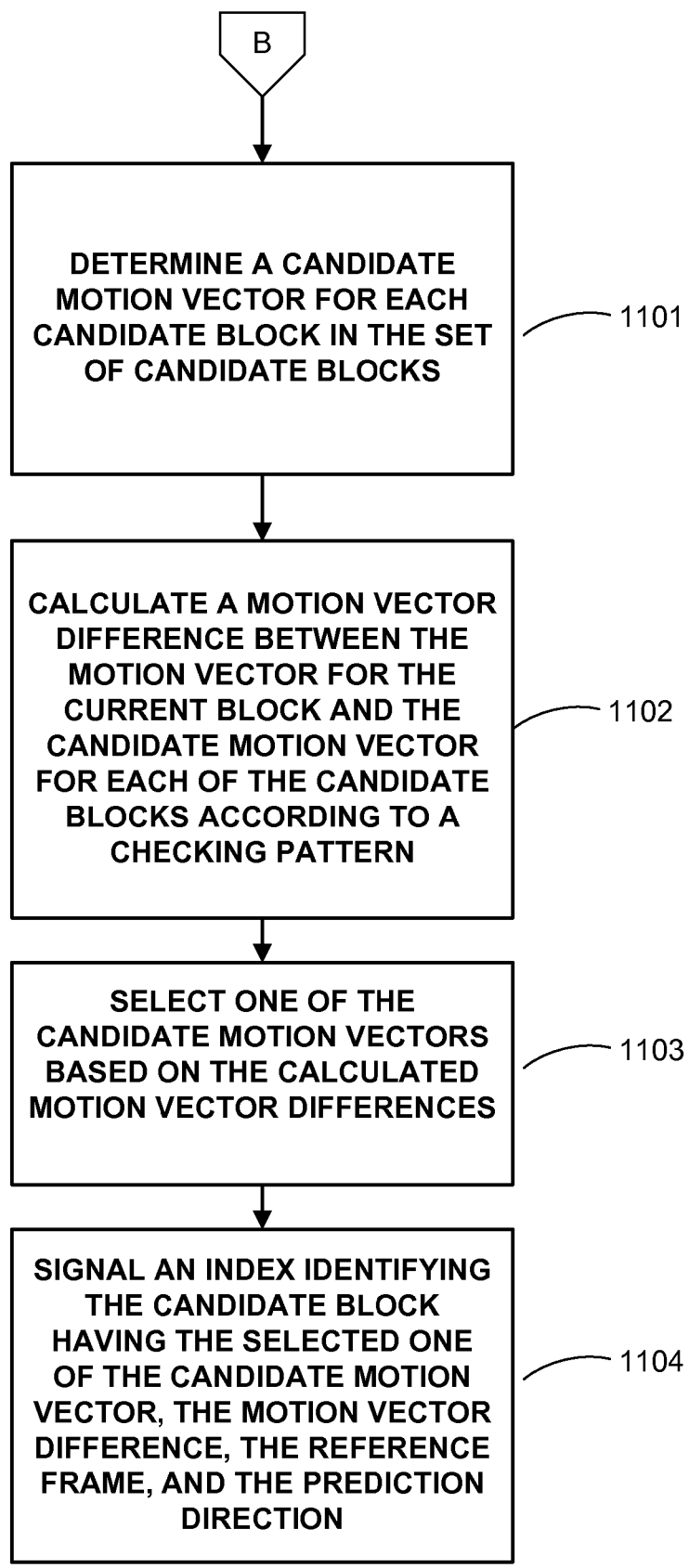
FIG. 11 is a flowchart illustrating an example method of encoding video in an AMVP mode.

FIG. 11 illustrates an example method of encoding video when the motion vector prediction process is in the AMVP mode. In this case, the video encoder is configured to determine a candidate motion vector from each candidate block in the set of candidate blocks (1101) and calculate a motion vector difference between the motion vector for the current block and the candidate motion vector from each of the candidate blocks according to a checking pattern (1102). The video encoder is also configured to select one of the candidate motion vectors based on the calculated motion vector differences (1103), and to signal an index identifying the candidate block having the selected one of the candidate motion vectors, to signal the motion vector difference calculated with respect to the selected one of the candidate motion vectors, to signal the reference frame, and to signal the prediction direction (1104).

In one example, the set of candidate blocks includes an above candidate block, a right above candidate block, a left candidate block, a below left candidate block, and a temporal candidate block. In this example, the checking pattern proceeds in the following order: below left candidate block, left candidate block, right above candidate block, above candidate block, temporal candidate block.

In another example, the set of candidate blocks includes a left above candidate block, an above candidate block, a right above candidate block, a left candidate block, a below left candidate block, and a temporal candidate block. The checking pattern proceeds in the following order: left candidate block, below left candidate block, above candidate block, right above candidate block, left above candidate block, temporal candidate block.

Figure 12:
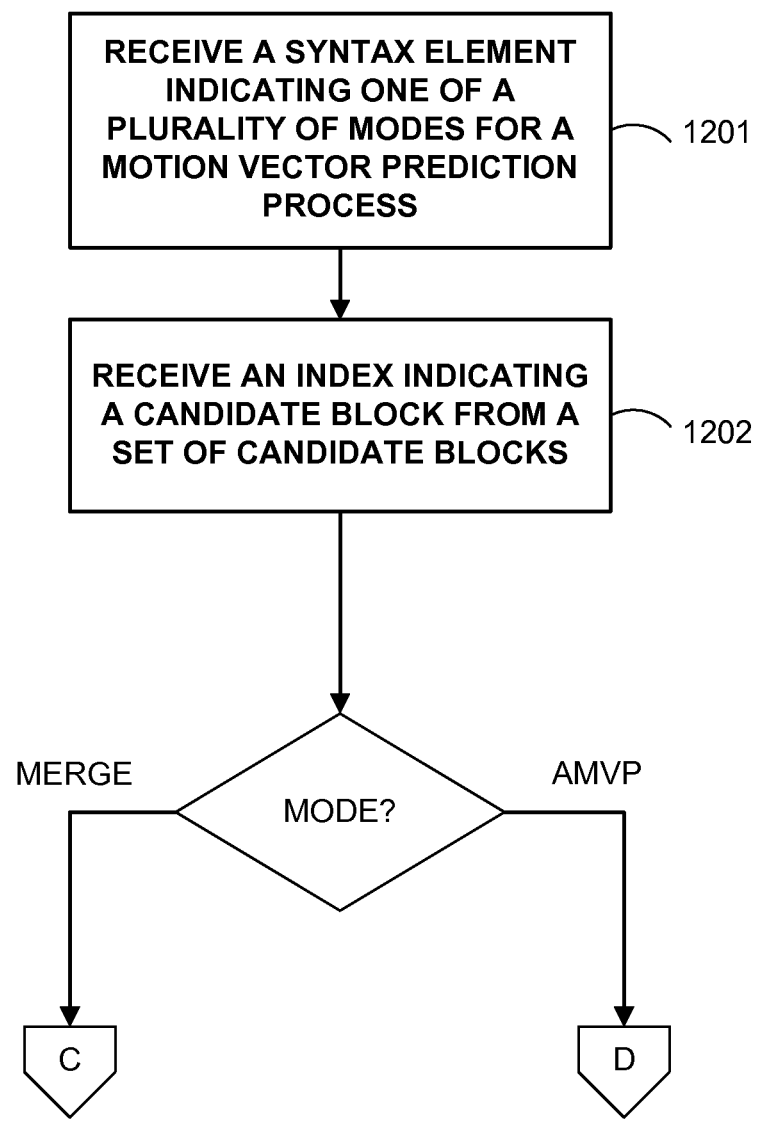
FIG. 12 is a flowchart illustrating an example method of decoding video.

FIG. 12 is a flowchart illustrating an example method of decoding video, which may be performed by a video decoder, such as the video decoder 30 of FIG. 3. Video decoder 30 may be configured to receive a syntax element indicating one of a plurality of modes for a motion vector prediction process for a current block of video data (1201), and to receive an index indicating a candidate block from a set of candidate blocks (1202), wherein the set of candidate blocks is the same for each of the plurality of modes, and wherein information associated with the candidate block is used to decode a motion vector for the current block. The plurality of modes may include a merge mode and an adaptive motion vector prediction mode.

Figure 13:
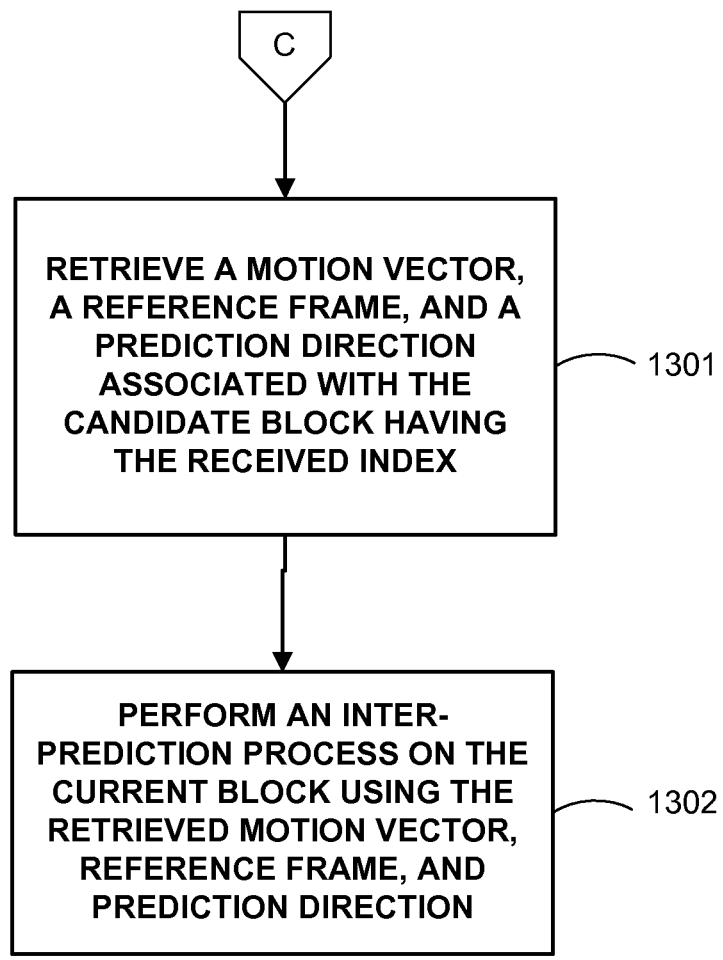
FIG. 13 is a flowchart illustrating an example method of decoding video in a merge mode.

FIG. 13 is a flowchart illustrating an example method of decoding video in the case that the motion vector prediction process is the merge mode. In this case, the video decoder is further configured to retrieve a motion vector, a reference frame, and a prediction direction associated with the candidate block having the received index (1301), and to perform an inter-prediction process on the current block using the retrieved motion vector, reference frame, and prediction direction (1302).

In one example, the set of candidate blocks includes an above candidate block, a right above candidate block, a left candidate block, a below left candidate block, and a temporal candidate block. The left candidate block is adjacent a left edge of the current block and a top edge of the left candidate block is aligned with a top edge of the current block. The above candidate block is adjacent the top edge of the current block and a left edge of the above candidate block is aligned with the left edge of the current block.

In another example, the left candidate block is adjacent a left edge of the current block and a bottom edge of the left candidate block is aligned with a bottom edge of the current block. The above candidate block is adjacent a top edge of the current block and a right edge of the above candidate block is aligned with a right edge of the current block.

In another example, the set of candidate blocks includes a left above candidate block, an above candidate block, a right above candidate block, a left candidate block, a below left candidate block, and a temporal candidate block.

Figure 14:
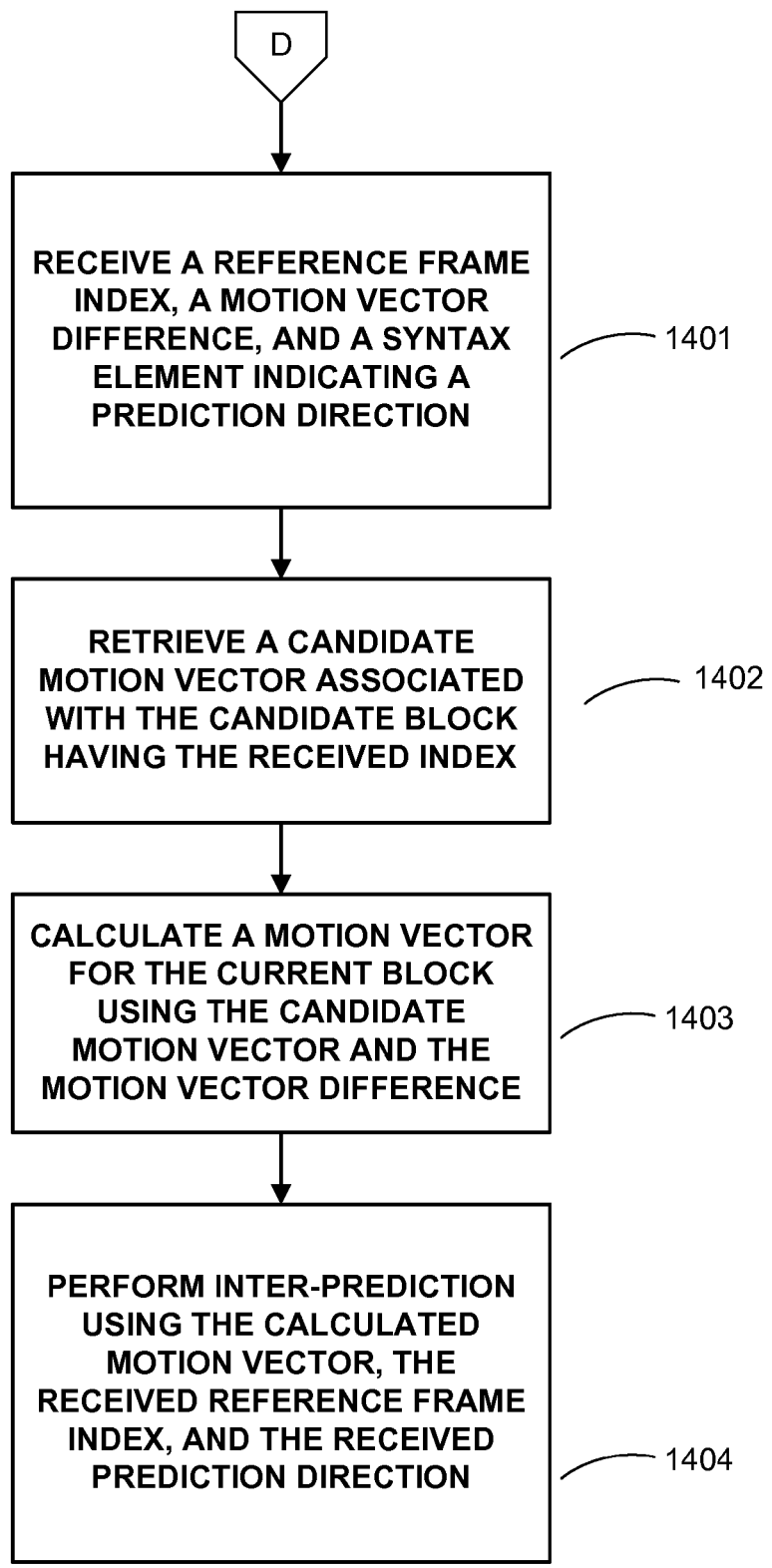
FIG. 14 is a flowchart illustrating an example method of decoding video in an AMVP mode.

FIG. 14 is a flowchart illustrating an example method of decoding video in the case that the motion vector prediction process is the AMVP mode. In this case, the video decoder is configured to receive a reference frame index, a motion vector difference, and a syntax element indicating a prediction direction (1401), and to retrieve a candidate motion vector associated with the candidate block having the received index (1402). The video decoder is further configured to calculate a motion vector for the current block using the candidate motion vector and the motion vector difference (1403), and to perform an inter-prediction process using the calculated motion vector, the received reference frame index, and the received prediction direction (1404).

In one example, the set of candidate blocks includes an above candidate block, a right above candidate block, a left candidate block, a below left candidate block, and a temporal candidate block, and a checking pattern for the set of candidate blocks proceeds in the following order: below left candidate block, left candidate block, right above candidate block, above candidate block, temporal candidate block.

In another example, the set of candidate blocks includes a left above candidate block, an above candidate block, a right above candidate block, a left candidate block, a below left candidate block, and a temporal candidate block, and a checking pattern for the set of candidate blocks proceeds in the following order: left candidate block, below left candidate block, above candidate block, right above candidate block, left above candidate block, temporal candidate block.

Figure 15:
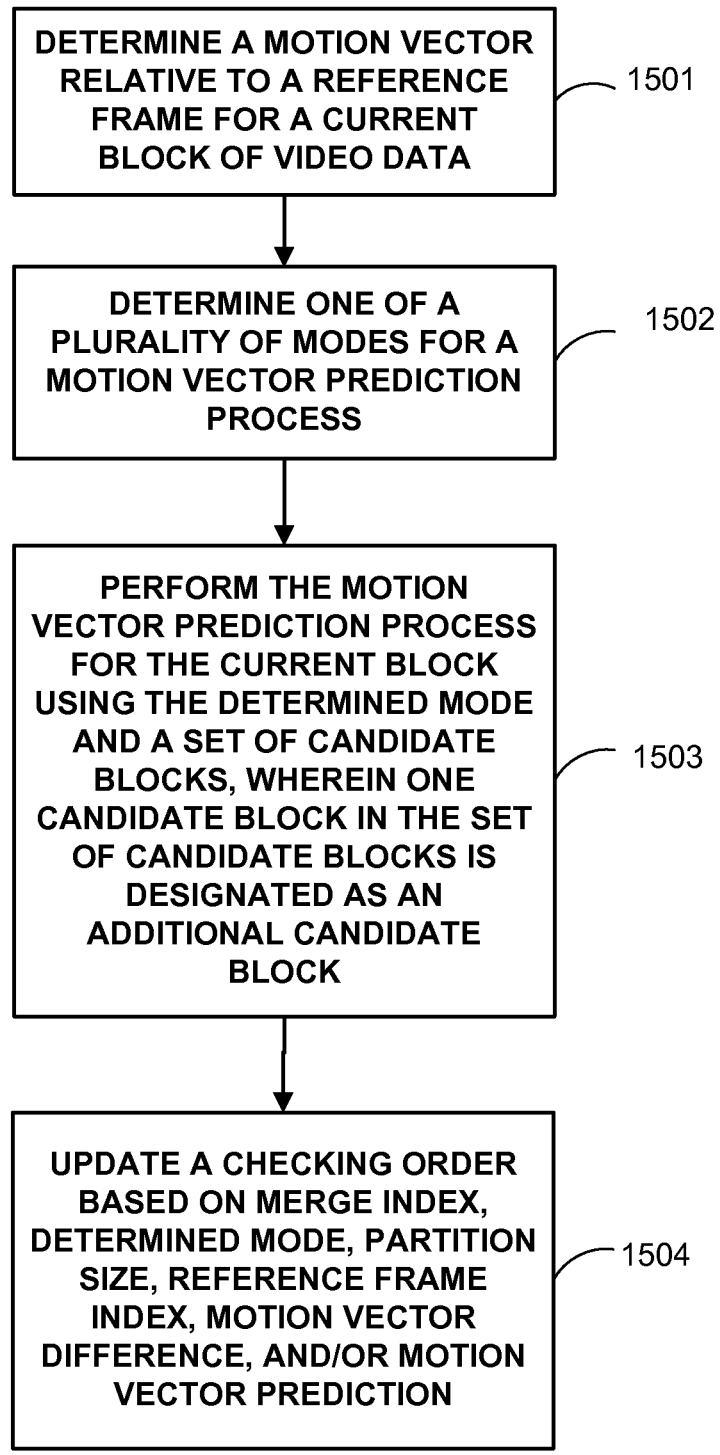
FIG. 15 is a flowchart illustrating another example method of encoding video.

FIG. 15 is a flowchart illustrating another example method of encoding video, which may be performed by a video encoder, such as the video encoder 20 of FIG. 3. The video encoder 20 may be configured to determine a motion vector relative to a reference frame for a current block of video data (1501), to determine one of a plurality of modes for a motion vector prediction process for a current block of video data (1502), and to perform the motion vector prediction process for the current block using the determined mode and a set of candidate blocks, wherein the set of candidate blocks is the same for each of the plurality of modes, and wherein one candidate block in the set of candidate blocks is designated as an additional candidate block (1503). The additional candidate block is used if another of the candidate blocks of the set of candidate blocks is unavailable. The video encoder 20 may be further configured to update a checking pattern based one or more of a merge index, a determined mode, a partition size, a reference frame index, a motion vector difference, and a motion vector prediction (1504).

The plurality of modes may include a merge mode and an adaptive motion vector prediction mode. The merge mode may have a maximum number N of candidate blocks for use in performing the motion vector prediction process. In that case, the motion vector prediction process is performed according to a checking pattern, the checking pattern defining an order for checking each of candidate blocks in the set of candidate blocks. The set of candidate blocks is defined as the first N available candidate blocks in the set of candidate blocks along the checking pattern. The checking pattern may be based on one or more of a block size, a partition size, and a partition index. More specifically, for example, the checking pattern for each different block size, partition size or partition index can be updated or modified based on the statistics of candidate selection in a number of previous coded blocks having the same block size, partition size or partition index, etc.

In another example, the set of candidate blocks include a below left candidate block, a left candidate block, an above candidate block, a right above candidate block, a left above candidate block, and a temporal candidate block. In this example, the additional candidate block is the left above candidate block. However, the additional candidate block may be any candidate block that is in a causal relationship to the current block.

Figure 16:
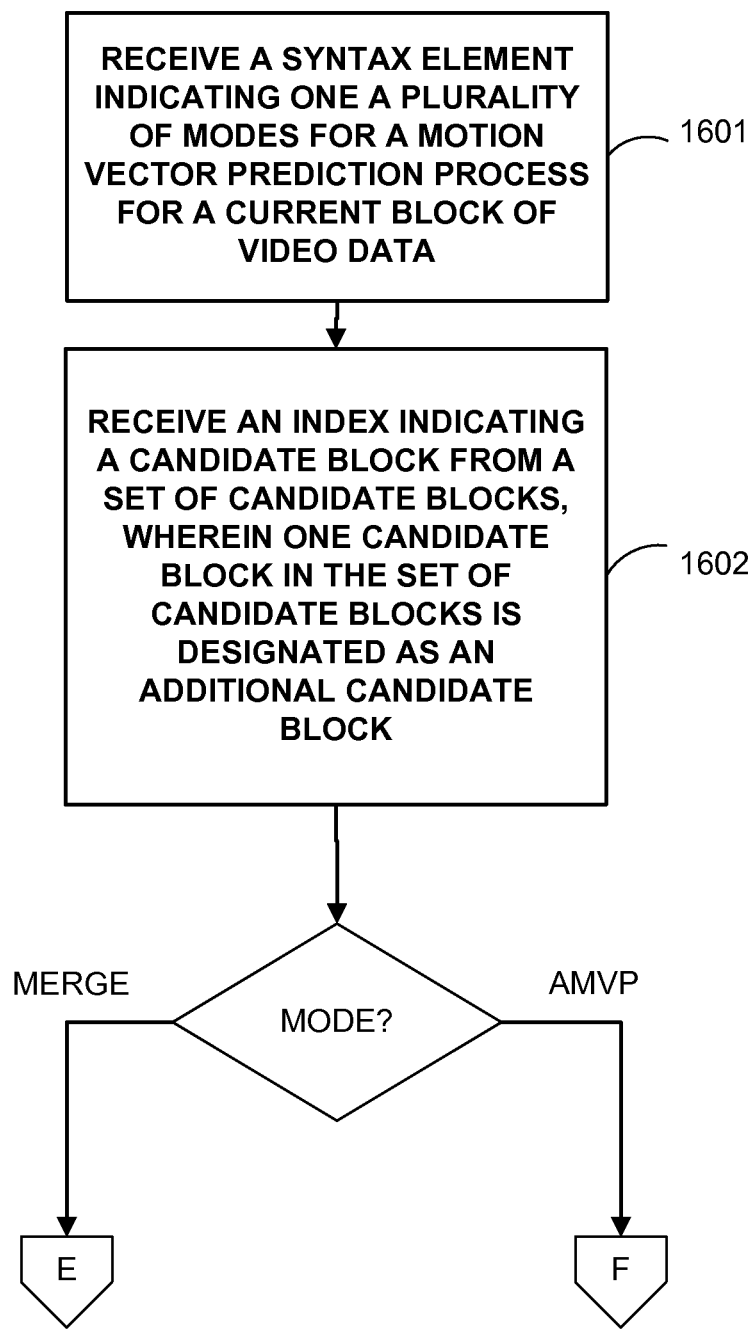
FIG. 16 is a flowchart illustrating another example method of decoding video.

FIG. 16 is a flowchart illustrating another example method of decoding video, which may be performed by a video decoder, such as the video decoder 30 of FIG. 3. The video decoder 30 may be configured to receive a syntax element indicating one of a plurality of modes for a motion vector prediction process for a current block of video data (1601), and to receive an index indicating a candidate block from a set of candidate blocks, wherein the set of candidate blocks is the same for each of the plurality of modes, wherein one candidate block in the set of candidate blocks is designated as an additional candidate block (1602). The additional candidate block is used if another of the candidate blocks of the set of candidate blocks is unavailable. The information associated with the candidate block is used to decode a motion vector for the current block.

Figure 17:
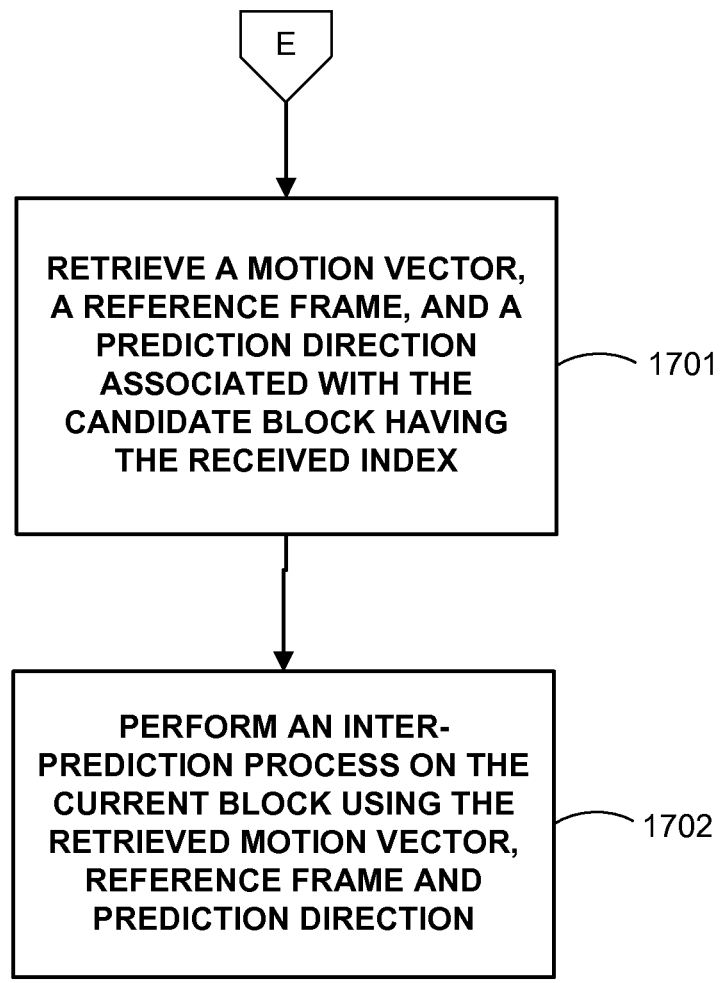
FIG. 17 is a flowchart illustrating another example method of decoding video in a merge mode.

The plurality of modes may include a merge mode and an adaptive motion vector prediction mode. FIG. 17 depicts a method of decoding in the case that the received syntax element indicates the merge mode is used. In this case, the video decoder is further configured to retrieve a motion vector, a reference frame, and a prediction direction associated with the candidate block having the received index (1701), and to perform an inter-prediction process on the current block using the retrieved motion vector, reference frame, and prediction direction (1702).

The merge mode may be defined as having a maximum number N of candidate blocks for use in performing the motion vector prediction process. In this case, the motion vector prediction process may be performed according to a checking pattern, the checking pattern defining an order for checking each of candidate blocks in the set of candidate blocks. The set of candidate blocks is defined as the first N available candidate blocks in the set of candidate blocks along the checking pattern. The checking pattern is based on one or more of a block size, a partition size, and a partition index.

In another example, for both merge and AMVP mode, the set of candidate blocks may include a below left candidate block, a left candidate block, an above candidate block, a right above candidate block, a left above candidate block, and a temporal candidate block. The additional candidate block is the left above candidate block. However, the additional candidate block may be any candidate block that is in a causal relationship to the current block.

Figure 18:
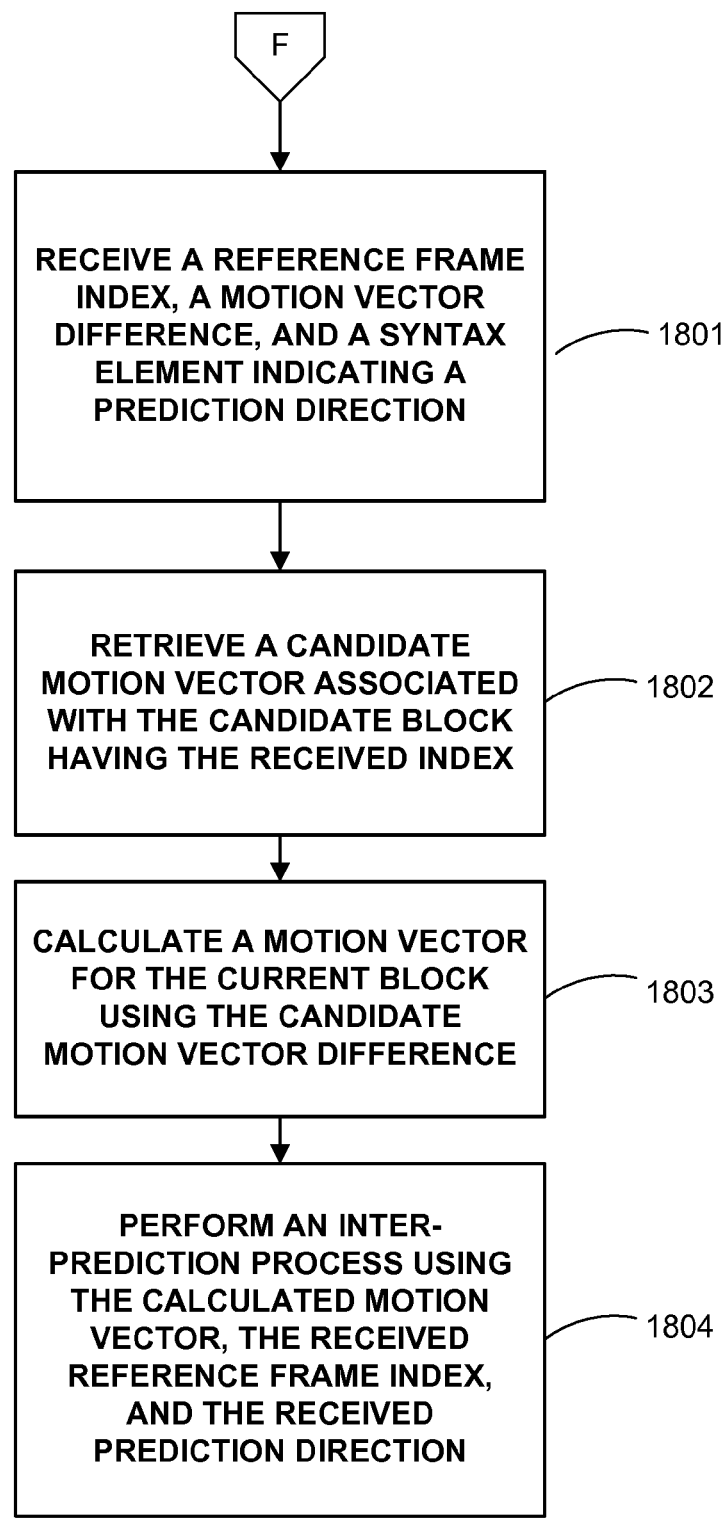
FIG. 18 is a flowchart illustrating another example method of decoding video in an AMVP mode.

FIG. 18 depicts a method of decoding in the case that the received syntax element indicates the AMVP mode is used. In this case, the video decoder is further configured to receive a reference frame index, a motion vector difference, and a syntax element indicating a prediction direction (1801), and to retrieve a candidate motion vector associated with the candidate block having the received index (1802). The video decoder is further configured to calculate a motion vector for the current block using the candidate motion vector and the motion vector difference (1803), and perform an inter-prediction process using the calculated motion vector, the received reference frame index, and the received prediction direction (1804).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding a motion vector in a video encoding process comprising:
    determining one of a plurality of modes for a motion vector prediction process for a current block of video data to be encoded, wherein the plurality of modes includes a merge mode and an adaptive motion vector prediction mode; and
    performing the motion vector prediction process for the current block of video data using the determined mode and a set of candidate blocks, wherein the set of candidate blocks is the same for each of the plurality of modes, and
    wherein the set of candidate blocks includes a left above candidate block, an above candidate block, a right above candidate block, a left candidate block, a below left candidate block, and a temporal candidate block.

2. The method of claim 1, wherein the determined mode is the merge mode and wherein the method further comprises:
    determining a candidate motion vector from the set of candidate blocks that satisfies a rate-distortion threshold; and
    signaling an index identifying the candidate motion vector.

3. The method of claim 1, wherein the determined mode is the adaptive motion vector prediction mode and wherein the method further comprises:
    determining a candidate motion vector for each candidate block in the set of candidate blocks;
    calculating a motion vector difference between a motion vector for the current block and the candidate motion vector for each of the candidate blocks according to a checking pattern;
    selecting one of the candidate motion vectors based on the calculated motion vector differences; and
    signaling an index identifying the selected one of the candidate motion vectors, the motion vector difference calculated with respect to the selected one of the candidate motion vectors, the reference frame, and the prediction direction.

4. The method of claim 3,
    wherein the checking pattern proceeds in an order starting from the left candidate block.

5. The method of claim 3,
    wherein the checking pattern proceeds in the following order: left candidate block proceeds below left candidate block, above candidate block proceeds right above candidate block.

6. The method of claim 3,
    wherein the checking pattern proceeds in the following order: left candidate block, below left candidate block, above candidate block, right above candidate block, left above candidate block, temporal candidate block.

7. An apparatus configured to encode a motion vector in a video encoding process comprising:
    a memory configured to store video data; and
    a video encoder in communication with the memory, the video encoder configured to:
        determine one of a plurality of modes for a motion vector prediction process for a current block of the video data to be encoded, wherein the plurality of modes includes a merge mode and an adaptive motion vector prediction mode; and
        perform the motion vector prediction process for the current block of the video data using the determined mode and a set of candidate blocks, wherein the set of candidate blocks is the same for each of the plurality of modes, and
    wherein the set of candidate blocks includes a left above candidate block, an above candidate block, a right above candidate block, a left candidate block, a below left candidate block, and a temporal candidate block.

8. The apparatus of claim 7, wherein the determined mode is the merge mode and wherein the video encoder is further configured to:
    determine a candidate motion vector from the set of candidate blocks that satisfies a rate-distortion threshold; and
    signal an index identifying the candidate motion vector.

9. The apparatus of claim 7, wherein the determined mode is the adaptive motion vector prediction mode and wherein the video encoder is further configured to:
    determine a candidate motion vector for each candidate block in the set of candidate blocks;
    calculate a motion vector difference between a motion vector for the current block and the candidate motion vector for each of the candidate blocks according to a checking pattern;
    select one of the candidate motion vectors based on the calculated motion vector differences; and
    signal an index identifying the selected one of the candidate motion vectors, the motion vector difference calculated with respect to the selected one of the candidate motion vectors, the reference frame, and the prediction direction.

10. The apparatus of claim 9,
    wherein the checking pattern proceeds in an order starting from the left candidate block.

11. The apparatus of claim 9,
    wherein the checking pattern proceeds in the following order: left candidate block proceeds below left candidate block, above candidate block proceeds right above candidate block.

12. The apparatus of claim 9,
    wherein the checking pattern proceeds in the following order: left candidate block, below left candidate block, above candidate block, right above candidate block, left above candidate block, temporal candidate block.

13. An apparatus configured to encode a motion vector in a video encoding process comprising:
- means for determining one of a plurality of modes for a motion vector prediction process for a current block of video data to be encoded, wherein the plurality of modes includes a merge mode and an adaptive motion vector prediction mode; and
- means for performing the motion vector prediction process for the current block of video data using the determined mode and a set of candidate blocks, wherein the set of candidate blocks is the same for each of the plurality of modes, and
- wherein the set of candidate blocks includes a left above candidate block, an above candidate block, a right above candidate block, a left candidate block, a below left candidate block, and a temporal candidate block.

14. A non-transitory computer-readable storage medium having stored thereon instructions that, when executed, cause one or more processors of a device for encoding video data to:
- determine one of a plurality of modes for a motion vector prediction process for a current block of video data to be encoded, wherein the plurality of modes includes a merge mode and an adaptive motion vector prediction mode; and
- perform the motion vector prediction process for the current block of video data using the determined mode and a set of candidate blocks, wherein the set of candidate blocks is the same for each of the plurality of modes, and
- wherein the set of candidate blocks includes a left above candidate block, an above candidate block, a right above candidate block, a left candidate block, a below left candidate block, and a temporal candidate block.

15. A method of decoding a motion vector in a video decoding process comprising:
- determining one of a plurality of modes for a motion vector prediction process for a current block of video data, wherein the plurality of modes includes a merge mode and an adaptive motion vector prediction mode; and
- determining a candidate block from a set of candidate blocks, wherein the set of candidate blocks is the same for each of the plurality of modes, and wherein information associated with the candidate block is used to decode a motion vector for the current block, and
- wherein the set of candidate blocks includes a left above candidate block, an above candidate block, a right above candidate block, a left candidate block, a below left candidate block, and a temporal candidate block.

16. The method of claim 15, further comprising:
- receiving a syntax element indicating the motion vector prediction process, wherein the received syntax element indicates the motion vector prediction process is the merge mode;
- receiving an index indicating the candidate block;
- retrieving a motion vector, a reference frame, and a prediction direction associated with the candidate block having the received index; and
- performing an inter-prediction process on the current block using the retrieved motion vector, reference frame, and prediction direction.

17. The method of claim 15, the method further comprising:
- receiving a syntax element indicating the motion vector prediction process, wherein the received syntax element indicates the motion vector prediction process is the adaptive motion vector prediction mode;
- receiving an index indicating the candidate block;
- receiving a reference frame index, a motion vector difference, and a syntax element indicating a prediction direction;
- retrieving a candidate motion vector associated with the candidate block having the received index;
- calculating a motion vector for the current block using the candidate motion vector and the motion vector difference; and
- performing an inter-prediction process using the calculated motion vector, the received reference frame index, and the received prediction direction.

18. The method of claim 17, wherein the checking pattern proceeds in an order starting from the left candidate block.

19. The method of claim 17, wherein the checking pattern proceeds in the following order: left candidate block proceeds below left candidate block, above candidate block proceeds right above candidate block.

20. The method of claim 17, wherein the checking pattern proceeds in the following order: left candidate block, below left candidate block, above candidate block, right above candidate block, left above candidate block, temporal candidate block.

21. An apparatus configured to decode a motion vector in a video decoding process comprising:
- a memory configured to store video data; and
- a video decoder in communication with the memory, the video decoder configured to:
- determine one of a plurality of modes for a motion vector prediction process for a current block of the video data, wherein the plurality of modes includes a merge mode and an adaptive motion vector prediction mode; and
- determine a candidate block from a set of candidate blocks, wherein the set of candidate blocks is the same for each of the plurality of modes, and wherein information associated with the candidate block is used to decode a motion vector for the current block, and
- wherein the set of candidate blocks includes a left above candidate block, an above candidate block, a right above candidate block, a left candidate block, a below left candidate block, and a temporal candidate block.

22. The apparatus of claim 21, wherein the video decoder is further configured to:
- receive a syntax element indicating the motion vector prediction process, wherein the received syntax element indicates the motion vector prediction process is the merge mode;
- receive an index indicating the candidate block;
- retrieve a motion vector, a reference frame, and a prediction direction associated with the candidate block having the received index; and
- perform an inter-prediction process on the current block using the retrieved motion vector, reference frame, and prediction direction.

23. The apparatus of claim 21, wherein the video decoder is further configured to:
- receive a syntax element indicating the motion vector prediction process, wherein the received syntax element indicates the motion vector prediction process is the adaptive motion vector prediction mode;
- receive an index indicating the candidate block;
- receive a reference frame index, a motion vector difference, and a syntax element indicating a prediction direction;
- retrieve a candidate motion vector associated with the candidate block having the received index;

calculate a motion vector for the current block using the candidate motion vector and the motion vector difference; and perform an inter-prediction process using the calculated motion vector, the received reference frame index, and the received prediction direction.

24. The apparatus of claim 23,
wherein the checking pattern proceeds in an order starting from the left candidate block.

25. The apparatus of claim 23,
wherein the checking pattern proceeds in the following order: left candidate block proceeds below left candidate block, above candidate block proceeds right above candidate block.

26. The apparatus of claim 23,
wherein the checking pattern proceeds in the following order: left candidate block, below left candidate block, above candidate block, right above candidate block, left above candidate block, temporal candidate block.

27. An apparatus configured to decode a motion vector in a video decoding process comprising:
means for determining one of a plurality of modes for a motion vector prediction process for a current block of video data, wherein the plurality of modes includes a merge mode and an adaptive motion vector prediction mode; and means for determining a candidate block from a set of candidate blocks, wherein the set of candidate blocks is the same for each of the plurality of modes, and wherein information associated with the candidate block is used to decode a motion vector for the current block, and wherein the set of candidate blocks includes a left above candidate block, an above candidate block, a right above candidate block, a left candidate block, a below left candidate block, and a temporal candidate block.

28. A non-transitory computer-readable storage medium having stored thereon instructions that, when executed, cause one or more processors of a device for decoding video data to:
determine one of a plurality of modes for a motion vector prediction process for a current block of video data, wherein the plurality of modes includes a merge mode and an adaptive motion vector prediction mode; and determine a candidate block from a set of candidate blocks, wherein the set of candidate blocks is the same for each of the plurality of modes, and wherein information associated with the candidate block is used to decode a motion vector for the current block, and wherein the set of candidate blocks includes a left above candidate block, an above candidate block, a right above candidate block, a left candidate block, a below left candidate block, and a temporal candidate block.

* * * * *